(12) United States Patent
Umeda et al.

(10) Patent No.: US 10,473,970 B2
(45) Date of Patent: Nov. 12, 2019

(54) LIQUID CRYSTAL DISPLAY

(71) Applicant: Mitsubishi Electric Corporation, Tokyo (JP)

(72) Inventors: Hiroshi Umeda, Tokyo (JP); Manabu Iwakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 15/454,204

(22) Filed: Mar. 9, 2017

(65) Prior Publication Data
US 2017/0285398 A1  Oct. 5, 2017

(30) Foreign Application Priority Data

Mar. 30, 2016  (JP) ................. 2016-067060

(51) Int. Cl.
*G02F 1/1335* (2006.01)
*G02F 1/13363* (2006.01)

(52) U.S. Cl.
CPC .... *G02F 1/133528* (2013.01); *G02F 1/13363* (2013.01); *G02F 2001/133531* (2013.01); *G02F 2201/56* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 2004/0085496 A1* | 5/2004 | Paukshto | .......... | G02F 1/133528 349/106 |
| 2009/0153783 A1* | 6/2009 | Umemoto | ............. | G02B 27/28 349/96 |
| 2012/0112988 A1* | 5/2012 | Nakanishi | ......... | G02F 1/134309 345/76 |
| 2012/0182488 A1* | 7/2012 | Kuwajima | ............ | G02F 1/1347 349/15 |
| 2013/0077017 A1* | 3/2013 | Aoki | ................. | G02F 1/133308 349/58 |
| 2015/0211707 A1* | 7/2015 | Watanabe | ......... | G02F 1/133308 345/667 |

(Continued)

FOREIGN PATENT DOCUMENTS

| | | |
|---|---|---|
| JP | 2004-212498 A | 7/2004 |
| WO | 2007/108244 A1 | 9/2007 |
| WO | WO 2007/108244 * | 9/2007 |

*Primary Examiner* — Ryan Crockett
(74) *Attorney, Agent, or Firm* — Studebaker & Brackett PC

(57) ABSTRACT

In a liquid crystal display, a liquid crystal cell and a polarizing plate respectively have a planar, non-rectangular shape. The polarizing plate has an axis that is either an absorption axis or a slow axis. The planar shape of the polarizing plate includes first and second sides respectively extending in a direction perpendicular to the axis and a direction tilted from the axis. The polarizing plate includes first and second peripheral portions respectively lying along the first and second sides, and includes a corner portion lying at a portion where the first and second peripheral portions overlap each other. The polarizing plate is applied by a bonding agent onto a main surface of the liquid crystal cell so that the corner portion is not coupled to the main surface. A contour portion extending in a direction tilted from the axis may not be coupled to the main surface.

10 Claims, 12 Drawing Sheets

(56) References Cited

U.S. PATENT DOCUMENTS

| | | | |
|---|---|---|---|
| 2016/0154271 A1* | 6/2016 | Kim | G02F 1/133308 |
| | | | 349/58 |
| 2016/0266457 A1* | 9/2016 | Lee | H01L 27/124 |
| 2016/0363795 A1* | 12/2016 | Jeon | G02F 1/1339 |
| 2017/0038632 A1* | 2/2017 | Hsu | G02F 1/133308 |
| 2017/0110479 A1* | 4/2017 | Chen | H01L 27/0255 |
| 2018/0074353 A1* | 3/2018 | Hirata | G02F 1/1339 |
| 2018/0143486 A1* | 5/2018 | Kadowaki | G02F 1/133 |
| 2018/0188594 A1* | 7/2018 | Kanehiro | G02F 1/1339 |

* cited by examiner

LIQUID CRYSTAL DISPLAY

BACKGROUND OF THE INVENTION

Field of the Invention

The present invention relates to a liquid crystal display.

Description of the Background Art

Conventional liquid crystal displays having a planar, rectangular shape have mainly been provided. In order to provide a higher added value, some liquid crystal displays having a planar, non-rectangular shape have recently been provided. Since a liquid crystal display having a planar, non-rectangular shape, which is sometimes called, for example, as a heteromorphic liquid crystal display, is applicable in various purposes such as on-vehicle instrument panels and mobile communication terminals, expanded demands are expected in upcoming years.

Technologies respectively described in Japanese Patent Application Laid-Open No. 2004-212498 and International Publication No. 2007/108244 relate to heteromorphic liquid crystal displays. In Japanese Patent Application Laid-Open No. 2004-212498, a heteromorphic liquid crystal display having a planar, polygonal shape is described. In international Publication No. 2007/108244, a heteromorphic liquid crystal display having a planar, circular shape is described.

An ordinary liquid crystal display is applied with polarizing plates respectively on a main surface and another main surface of a liquid crystal cell. The polarizing plates may be laminated bodies applied with protective layers (TAC layers) respectively on a main surface and another main surface of each of polarizing films, or laminated bodies applied protective layers (TAC layers) respectively on a main surface and another main surface of each of laminated films laminated with a polarizing fill and a phase difference film. The points described above can be regarded as similar or identical in a heteromorphic liquid crystal display, as well as in the technologies respectively described in Japanese Patent Application Laid-Open No. 2004-212498 and International Publication No. 2007/108244. However, in the technologies respectively described in Japanese Patent Application Laid-Open No. 2004-212498 and International. Publication No. 2007/108244, an absorption axis direction and a slow axis direction of a polarizing plate are still unknown.

If a thermal shock is applied onto a conventional heteromorphic liquid crystal display after polarizing plates are applied respectively on a main surface and another main surface of a liquid crystal cell, peripheral portions of the polarizing plates would be likely to crack.

SUMMARY OF THE INVENTION

The present invention has an object to prevent as much as possible a peripheral portion of a polarizing plate included in a liquid crystal display having a planar, non-rectangular shape from being cracked.

According to a first aspect of the present invention, in a liquid crystal display, a liquid crystal cell and a polarizing plate respectively have a planar, non-rectangular shape.

The polarizing plate has an axis that is either an absorption axis or a slow axis.

The planar shape of the polarizing plate includes a first side extending in a direction perpendicular to the axis, and a second side extending in a direction tilted from the axis. The polarizing plate includes a first peripheral portion lying along the first side, a second peripheral portion lying along the second side, and a corner portion lying at a portion where the first peripheral portion and the second peripheral portion overlap each other. The polarizing plate is applied by a bonding agent onto a main surface of the liquid crystal cell so that the corner portion is not coupled to the main surface of the liquid crystal cell.

According to a second aspect of the present invention, in a liquid crystal display, a liquid crystal cell and a polarizing plate respectively have a planar, non-rectangular shape.

The polarizing plate has an axis that is either an absorption axis or a slow axis.

The planar shape of the polarizing plate includes a contour portion extending in a direction tilted from the axis. The polarizing plate includes a peripheral portion lying along the contour portion. The polarizing plate is applied by a bonding agent onto a main surface of the liquid crystal cell so that the peripheral portion is not coupled to the main surface of the liquid crystal cell.

A portion of the peripheral portion of the polarizing plate included in the liquid crystal display having a planar, non-rectangular shape, which would be likely to crack, is not fixed onto the main surface of the liquid crystal cell, but lies freely. As a result, since, when a thermal shock is applied onto the liquid crystal display, the peripheral portion of the polarizing plate is less likely to crack, the peripheral portion of the polarizing plate is prevented as much as possible from being cracked.

These and other objects, features, aspects and advantages of the present invention will become more apparent from the following detailed description of the present invention when taken in conjunction with the accompanying drawings.

DESCRIPTION OF THE PREFERRED EMBODIMENTS

1 Cause of Crack

Figure 20:
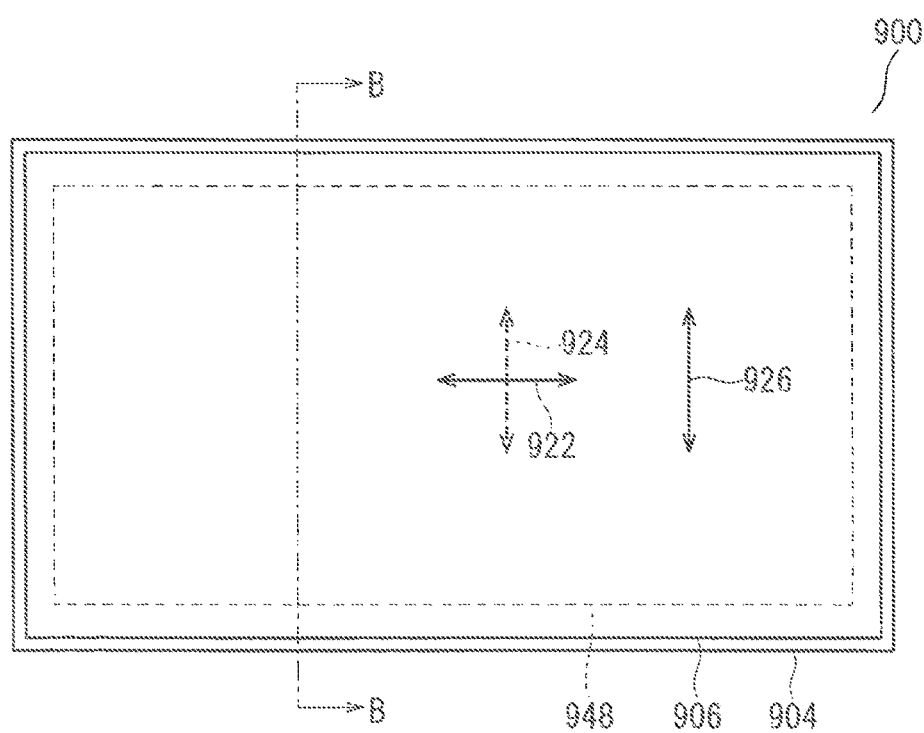
FIG. 20 is a plan view of a liquid crystal display having a planar, rectangular shape.
Figure 21:
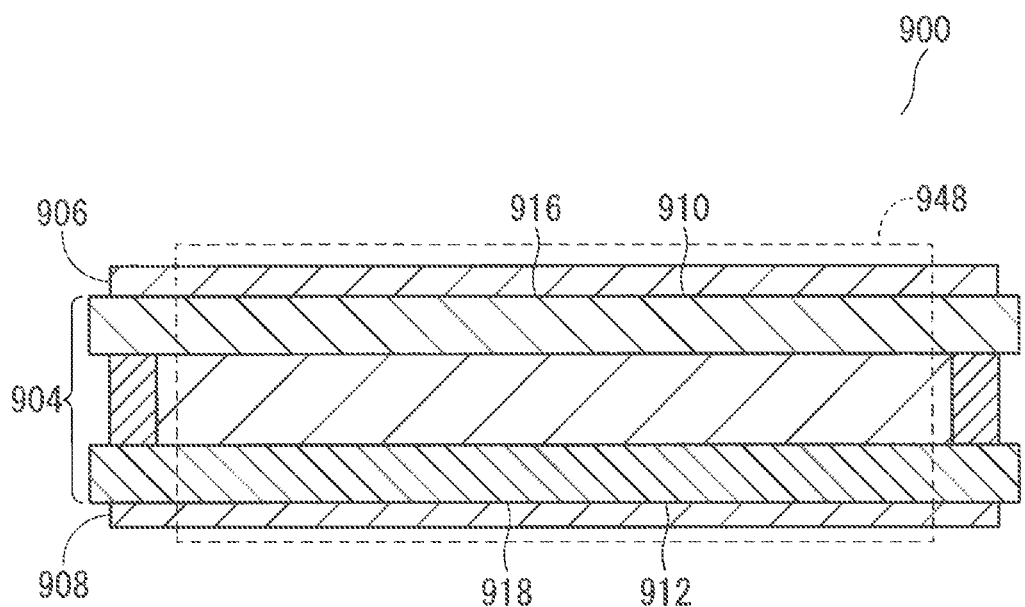
FIG. 21 is a cross-sectional view of the liquid crystal display having the planar, rectangular shape.

FIGS. 20 and 21 are schematic views of a liquid crystal display having a planar, rectangular shape. FIG. 20 is a plan view. FIG. 21 is a cross-sectional view taken along a line B-B shown in FIG. 20.

A liquid crystal display 900 shown in FIGS. 20 and 21 includes a liquid crystal cell 904, a polarizing plate 906, a polarizing plate 908, an adhesive 910, and an adhesive 912.

The polarizing plate 906 is applied by the adhesive 910 onto a main surface 916 of the liquid crystal cell 904. The polarizing plate 906 includes a polarizing film and a phase difference film.

The polarizing film included in the polarizing plate 906 is produced and obtained by performing an extension process for a film member for a polarizing film and cutting the extended film member for the polarizing film. The obtained polarizing film has an absorption axis extending in an absorption axis direction 922 corresponding to a direction toward which the extension process has been performed, and contains a compression residual stress in a direction perpendicular to the absorption axis direction 922.

The phase difference film included in the polarizing plate 906 is produced and obtained by performing an extension process for a film member for a phase difference film and cutting the extended film member for the phase difference film. The obtained phase difference film has a slow axis extending in a slow axis direction 924 corresponding to a direction toward which the extension process has been performed, and contains a compression residual stress in a direction perpendicular to the slow axis direction 924.

Therefore, the polarizing plate 906 has the absorption axis and the slow axis, and contains the compression residual stresses in the respective directions perpendicular to the absorption axis direction 922 and the slow axis direction 924.

The polarizing plate 908 is applied by the adhesive 912 onto another main surface 918 of the liquid crystal 904. The polarizing plate 908 includes a polarizing film.

The polarizing film included in the polarizing plate 908 is produced and obtained by performing an extension process for a film member for a polarizing film and cutting the extended film member for the polarizing film. The obtained polarizing film has an absorption axis extending in an absorption axis direction 926 corresponding to a direction toward which the extension process has been performed, and contains a compression residual stress in a direction perpendicular to the absorption axis direction 926.

Therefore, the polarizing plate 908 has the absorption axis, and contains the compression residual stress in the direction perpendicular to the absorption axis direction 926.

Figure 22:
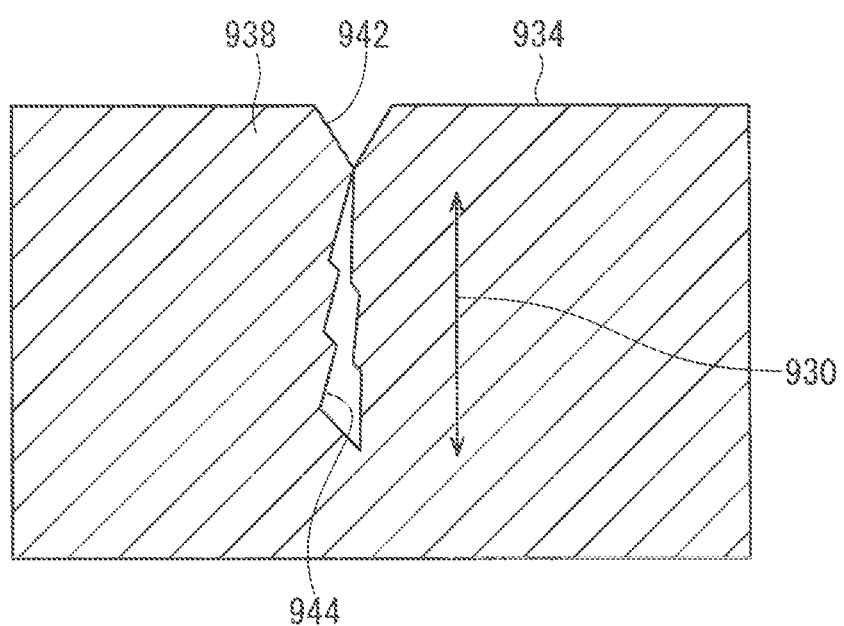
FIG. 22 is a cross-sectional view of a cracked peripheral portion of a polarizing plate.

FIG. 22 is a cross-sectional view of a cracked peripheral portion of a polarizing plate.

A planar shape of the polarizing plate 906 includes, as shown in FIG. 22, a side 934 extending in a direction perpendicular to an axis direction 930 that is either the absorption axis direction 922 or the slow axis direction 924. On the polarizing plate 906, a dent (a fine crack) 942 would be likely to occur on a peripheral portion 938 lying along the side 934. A reason of why the dent 942 would be likely to occur on the peripheral portion 938 is a compression stress acting on a cut section when a film member for a polarizing film or a film member for a phase difference film is cut.

If the dent 942 has occurred on the peripheral portion 938 of the polarizing plate 906, and a thermal shock is applied after the polarizing plate 906 is applied onto the main surface 916 of the liquid crystal cell 904, a crack would grow from the dent 942 to form a crack 944 that is larger than the dent 942. A crack similar to the crack 944 would also occur on a peripheral portion of the polarizing plate 908.

If the crack 944 reaches a display area 948 onto which an image will be displayed, the crack 944 can be clearly identified, and the liquid crystal display 900 is thus determined as unacceptable.

The crack 944 would occur when a thermal shock is applied after the polarizing plate 906 is applied onto the main surface 916 of the liquid crystal cell 904. However, the crack 944 would not occur even when a thermal shock is applied onto the polarizing plate 906 before the polarizing plate 906 is applied onto the main surface 916 of the liquid crystal cell 904. Therefore, the crack 944 would possibly occur when a stress generated by a difference in magnitude of thermal expansion between the liquid crystal cell 904 and the polarizing plate 906 acts onto the dent 942 occurred on the peripheral portion 938 of the polarizing plate 906. The same can be applied to a crack that would occur on the peripheral portion of the polarizing plate 908.

Figure 23:
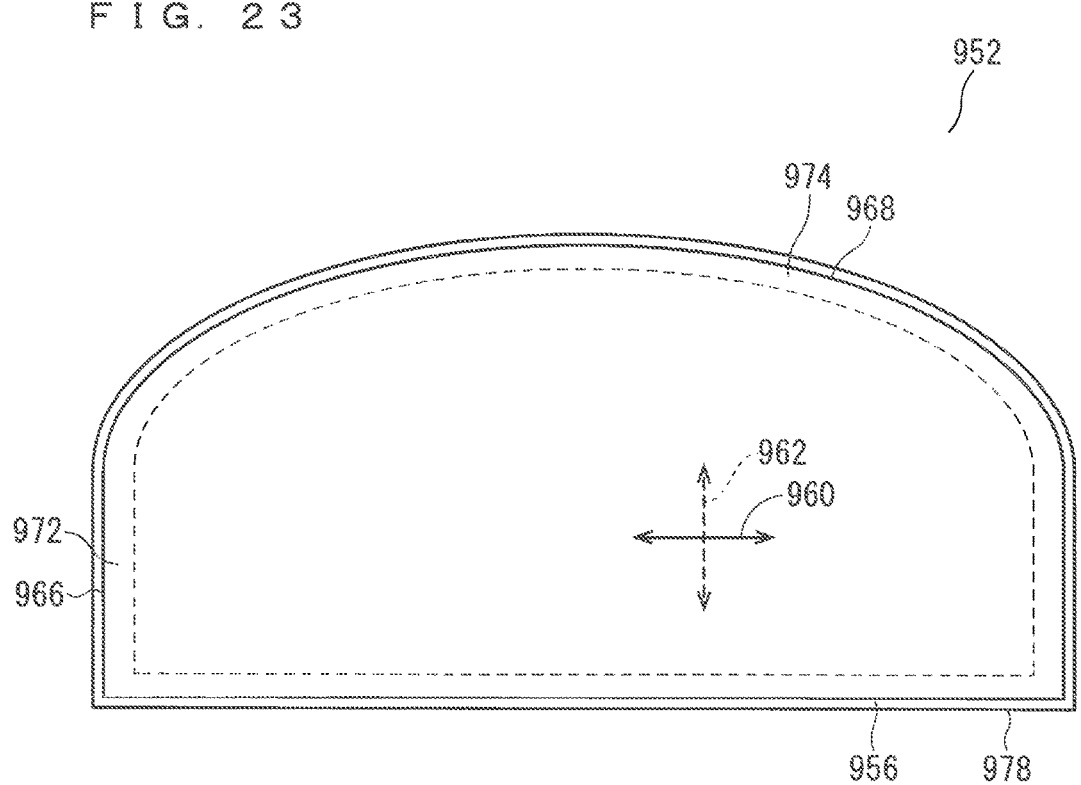
FIG. 23 is a plan view of a liquid crystal display having a planar shape including a circular arc contour portion.

2 Portion of Polarizing Plate Included in Heteromorphic Liquid Crystal Display, which would be Likely to Crack FIG. 23 is a schematic view of a liquid crystal display having a planar shape including a circular arc contour portion. FIG. 23 is a plan view.

A polarizing film included in a polarizing plate 956 included in a liquid crystal display 952 shown in FIG. 23 is produced and obtained by performing an extension process for a film member for a polarizing film and cutting the extended film member for the polarizing film. The polarizing film included in the polarizing plate 956 has an absorption axis extending in an absorption axis direction 960 corresponding to a direction toward which the extension process has been performed, and contains a compression residual stress in a direction perpendicular to the absorption axis direction 960.

A phase difference film included in the polarizing plate 956 is produced and obtained by performing an extension process for a film member for a phase difference film and cutting the extended film member for the phase difference film. The phase difference film included in the polarizing plate 956 has a slow axis extending in a slow axis direction 962 corresponding to a direction toward which the extension process has been performed, and contains a compression residual stress in a direction perpendicular to the slow axis direction 962.

Therefore, the polarizing plate 956 has the absorption axis and the slow axis, and contains the compression residual stresses in respective directions perpendicular to the absorption axis direction 960 and the slow axis direction 962.

A planar shape of the polarizing plate 956 includes, in addition to a contour portion 966 extending in a direction perpendicular to either the absorption axis direction 960 or the slow axis direction 962, a contour portion 968 extending in a direction tilted from both the absorption axis direction 960 and the slow axis direction 962. On the polarizing plate 956, a dent would be likely to occur on a peripheral portion 972 lying along the contour portion 966 and a peripheral portion 974 lying along the contour portion 968, where a dent would be more likely to occur on the peripheral portion 974. As a result, if a thermal shock is applied after the polarizing plate 956 is applied onto the liquid crystal cell 978, a crack would be more likely to occur on the peripheral portion 974.

Figure 24:
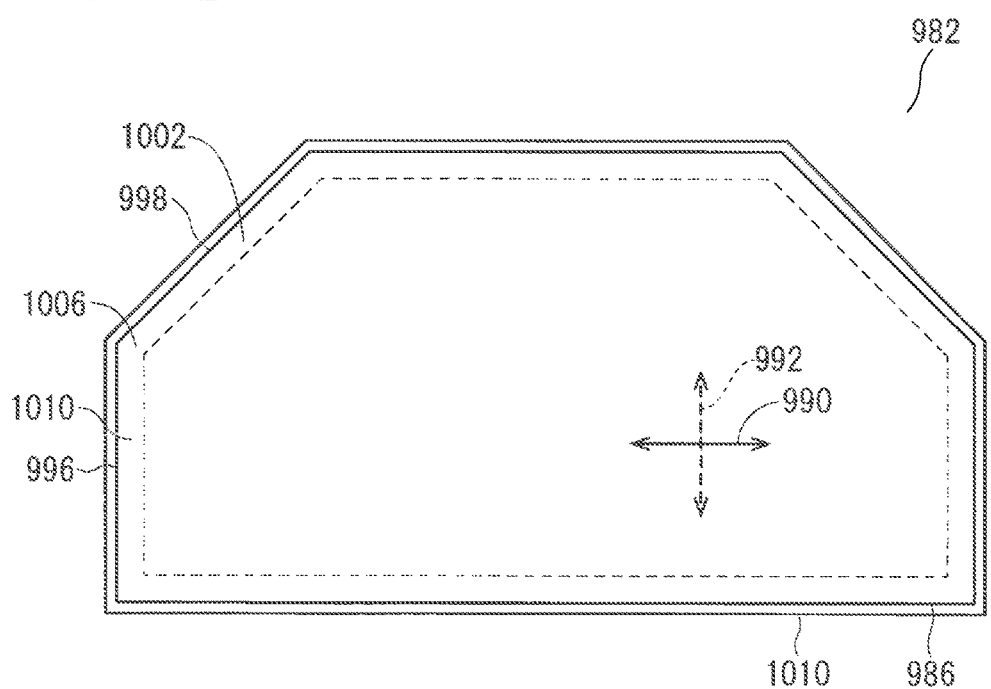
FIG. 24 is a plan view of a liquid crystal display having a planar, hexagonal shape.

FIG. 24 is a plan view of a liquid crystal display having a planar, hexagonal shape. FIG. 24 is the plan view.

A polarizing film included in a polarizing plate 986 included in a liquid crystal display 982 shown in FIG. 24 is produced and obtained by performing an extension process for a film member for a polarizing film and cutting the extended film member for the polarizing film. The polarizing film included in the polarizing plate 986 has an absorption axis extending in an absorption axis direction 990 corresponding to a direction toward which the extension process has been performed, and contains a compression residual stress in a direction perpendicular to the absorption axis direction 990.

A phase difference film included in the polarizing plate 986 is produced and obtained by performing an extension process for a film member for a phase difference film and cutting the extended film member for the phase difference film. The phase difference film included in the polarizing plate 986 has a slow axis extending in a slow axis direction 992 corresponding to a direction toward which the extension process has been performed, and contains a compression residual stress in a direction perpendicular to the slow axis direction 992.

Therefore, the polarizing plate 986 has the absorption axis and the slow axis, and contains the compression residual stresses in respective directions perpendicular to the absorption axis direction 990 and the slow axis direction 992.

A planar shape of the polarizing plate 986 includes, in addition to a side 996 extending in a direction perpendicular to either the absorption axis direction 990 or the a slow axis direction 992, a side 998 extending in a direction tilted from both the absorption axis direction 990 and the slow axis direction 992. On the polarizing plate 986, a dent would be likely to occur on a peripheral portion 1000 lying along the side 996 and a peripheral portion 1002 lying along the side 998, where a dent would be more likely to occur on the peripheral portion 1002, and a dent would be highly likely to occur at a corner portion 1006 where the peripheral portion 1000 and the peripheral portion 1002 overlap each other to create a singular point. As a result, if a thermal shock is applied after the polarizing plate 986 is applied onto a liquid crystal cell 1010, a crack would be more likely to occur on the peripheral portion 1002, and a crack would be highly likely to occur at the corner portion 1006.

A polarizing plate included in another heteromorphic liquid crystal display having a planar, non-rectangular shape, than the liquid crystal display 952 shown in FIG. 23 and the liquid crystal display 982 shown in FIG. 24, also has a portion on which a dent would be likely to occur, where, if a thermal shock is applied after the polarizing plate is applied onto a liquid crystal cell, a crack would be likely to occur.

A thermal shock might be applied when a liquid crystal display is inspected before shipping, as well as might be applied when the shipped liquid crystal display is used. As a result, a polarizing plate having a portion on which a crack would be likely to occur if a thermal shock is applied could lower not only a yield rate, but also reliability of the liquid crystal display.

To solve the above described problems, it has been expected that a polarizing plate included in a heteromorphic liquid crystal display is prevented as much as possible from cracking at a portion at which a crack would be likely to occur to increase not only a yield rate, but also to improve reliability of the heteromorphic liquid crystal display. Preferred embodiments described below have been provided to achieve this object.

3 First Preferred Embodiment 3.1 Outline of Liquid Crystal Display

Figure 1:
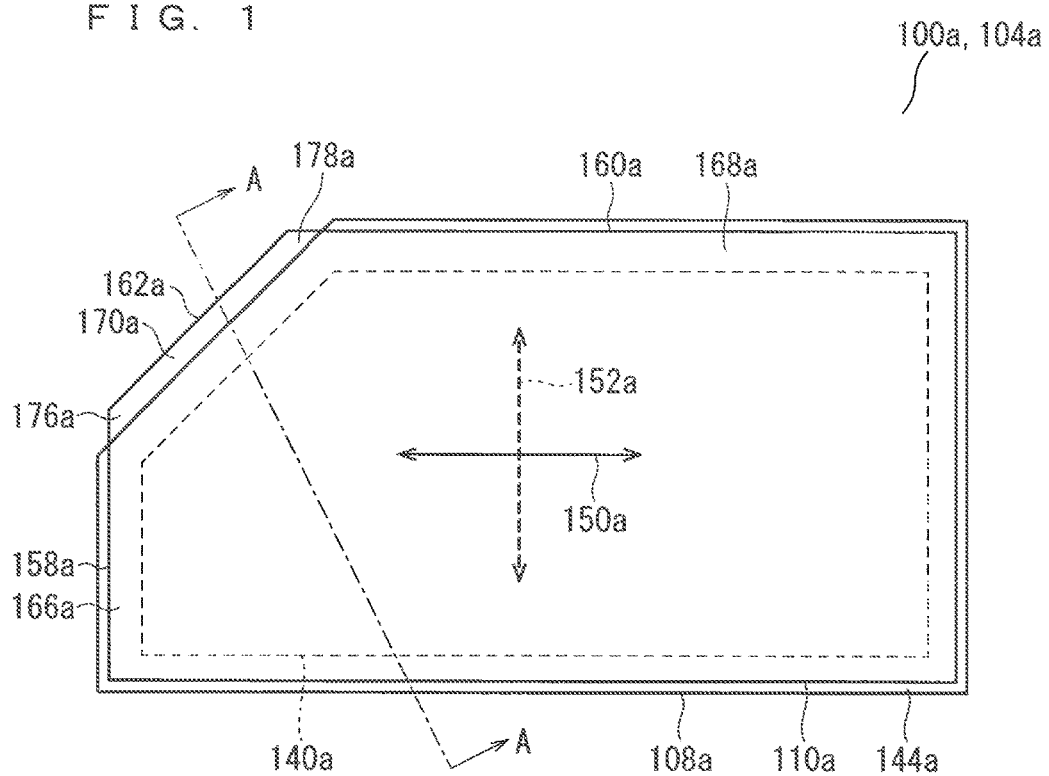
FIGS. 1 and 2 are plan views of a liquid crystal display according to a first preferred embodiment.
Figure 2:
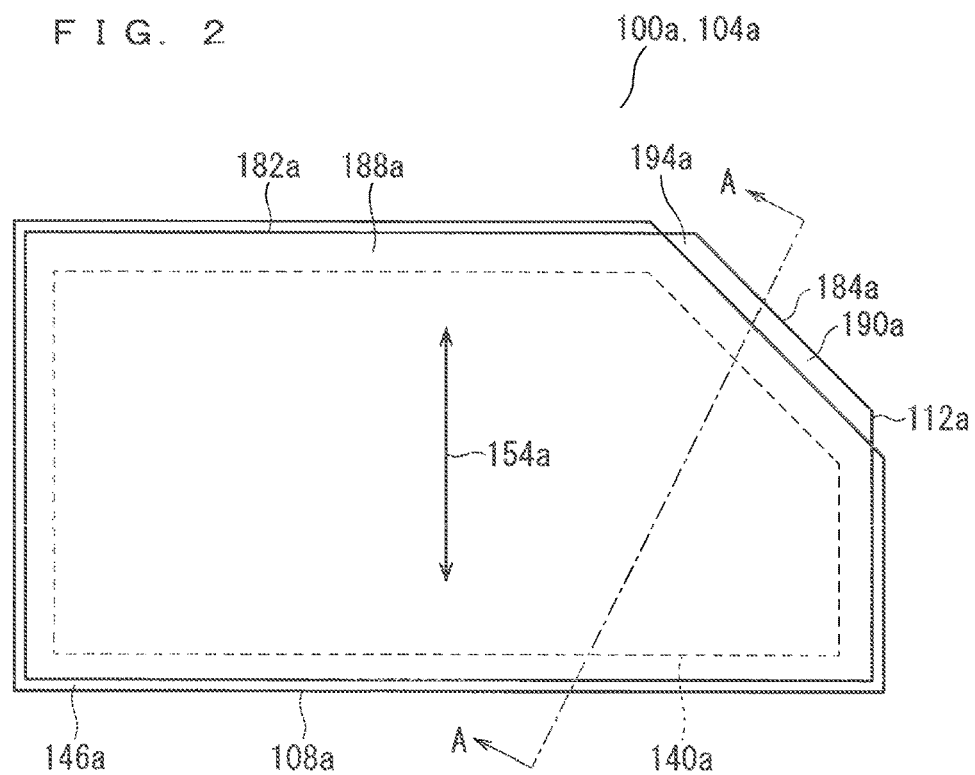
Figure 3:
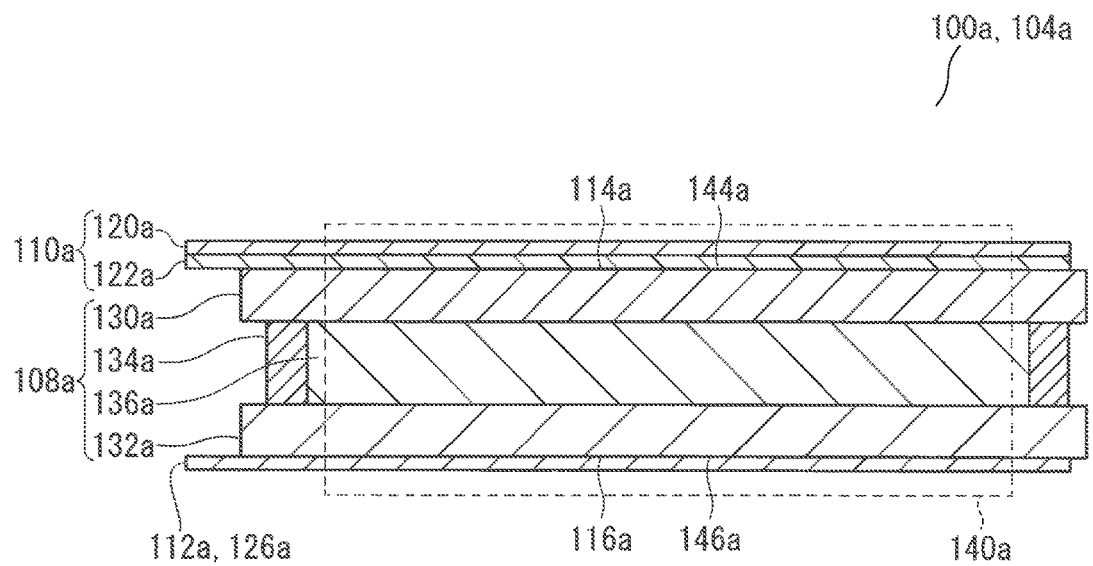
FIG. 3 is a cross-sectional view of the liquid crystal display according to the first preferred embodiment.

FIGS. 1, 2, and 3 are schematic views of a liquid crystal display according to a first preferred embodiment. FIG. 1 is a plan view when viewed from a display face side. FIG. 2 is another plan view when viewed from a back face side. FIG. 3 is a cross-sectional view taken along a line A-A shown in FIGS. 1 and 2.

A liquid crystal display 100a shown in FIGS. 1, 2, and 3 includes a liquid crystal display panel (liquid crystal panel) 104a. The liquid crystal panel 104a includes a liquid crystal cell 108a, a polarizing plate 110a, a polarizing plate 112a, an adhesive 114a, and an adhesive 116a. The polarizing plate 110a includes a polarizing film 120a and a phase difference film 122a. The polarizing plate 112a includes a polarizing film 126a. The liquid crystal cell 108a includes a color filter substrate 130a, a thin film transistor array substrate (TFT array substrate) 132a, a seal member 134a, and a liquid crystal layer 136a. The liquid crystal display 100a may include other components than the above described components.

The liquid crystal display 100a is a heteromorphic liquid crystal display having a planar, non-rectangular shape that is a planar, pentagonal shape obtained by removing a planar, triangular shape including an apex lying at top left of a planar, rectangular shape. Accordingly, the liquid crystal cell 108a, the polarizing plate 110a, the polarizing plate 112a, and a display area 140a also each have a planar, non-rectangular shape that is a planar, pentagonal shape. The planar, pentagonal shape may be replaced with another planar, non-rectangular shape. For example, the planar, pentagonal shape may be replaced with another planar, polygonal shape, than a pentagonal shape.

With an entire area facing a main surface 144a of the liquid crystal cell 108a, the polarizing plate 110a is applied by the adhesive 114a onto the main surface 144a of the liquid crystal cell 108a. With at least the display area 140a, the polarizing plate 110a is applied onto the main surface 144a of the liquid crystal cell 108a. A bonding agent made of the adhesive 114a which is a pressure-sensitive type may be replaced with another bonding agent made of an adhesive which is not the pressure-sensitive type.

The polarizing plate 110a is a laminated film where the polarizing film 120a and the phase difference film 122a are laminated each other. The phase difference film 122a is interposed between the polarizing film 120a and the liquid crystal cell 108a. The polarizing plate 110a may include other components than the polarizing film 120a and the phase difference film 122a. For example, the polarizing film 120a may include protective layers (TAC layers) respectively applied onto a main surface and another main surface of a laminated film where the polarizing film 120a and the phase difference film 122a are laminated each other. The phase difference film 122a contributes to expand an angle of visibility of the liquid crystal display 100a. The phase difference film 122a may be omitted.

An absorption axis of the polarizing film 120a extends in an absorption axis direction 150a forming an angle of 0° with a width direction of the liquid crystal display 100a. A slow axis of the phase difference film 122a extends in a slow axis direction 152a forming an angle of 90° with the width direction of the liquid crystal display 100a. Therefore, on the polarizing plate 110a, the slow axis and the absorption axis intersect at right angles.

With an entire area facing another main surface 146a of the liquid crystal cell 108a, the polarizing plate 112a is applied by the adhesive 116a onto the other main surface 146a of the liquid crystal cell 108a. With at least the display area 140a, the polarizing plate 112a is applied onto the other main surface 146a of the liquid crystal cell 108a. A bonding agent made of the adhesive 116a which is a pressure-sensitive type may be replaced with another bonding agent made of an adhesive which is not the pressure-sensitive type.

The polarizing plate 112a may include other components than the polarizing film 126a For example, the polarizing plate 112a may include protective layers (TAC layers) respectively applied onto a main surface and another main surface of the polarizing film 126a.

An absorption axis of the polarizing film 126a extends in an absorption axis direction 154a forming an angle of 90° with the width direction of the liquid crystal display 100a.

The arrangement as described above of the absorption axis of the polarizing plate 110a, the slow axis of the polarizing plate 110a, and the absorption axis of the polarizing plate 112a can advantageously be adopted in an optical design of a transverse electric field type liquid crystal display having a wider angle of visibility. The arrangement of the absorption axis of the polarizing plate 110a, the slow axis of the polarizing plate 110a, and the absorption axis of the polarizing plate 112a may be replaced with another arrangement. The absorption axis direction 150a, the slow axis direction 152a, and the absorption axis direction 154a may respectively be shifted by approximately ±0.5° from the above described directions. Such shifted angles could sometimes be caused by a production error that might occur, for example, when forming an external shape of a film, or when applying a film.

In the liquid crystal cell 108a, an inner main surface of the color filter substrate 130a and an inner main surface of the TFT array substrate 132a face each other, and a gap between the inner main surface of the color filter substrate 130a and the inner main surface of the TFT array substrate 132a is filled with the liquid crystal layer 136a, and sealed with the seal member 134a. On the TFT array substrate 132a, a TFT served as a switching element is arranged in plan. The TFT is arranged in plan on the display area 140a, which corresponds to a display face, of the liquid crystal cell 108a. The color filter substrate 130a is aligned to the TFT array substrate 132a.

An outer main surface of the color filter substrate 130a configures the main surface 144a of the liquid crystal cell 108a. An outer main surface of the TFT array substrate 132a configures the other main surface 146a of the liquid crystal cell 108a.

3.2 Structure for Preventing Cracks as Much as Possible

The liquid crystal panel 104a, the liquid crystal cell 108a, the polarizing plate 110a, the polarizing plate 112a, and the display area 140a each have, as shown in FIGS. 1 and 2, a planar, pentagonal shape. The planar shapes of the liquid crystal panel 104a, the liquid crystal cell 108a, the polarizing plate 110a, the polarizing plate 112a, and the display area 140a each have, at top left when viewed from the display face side, a side extending in a direction tilted from all of the absorption axis direction 150a, the slow axis direction 152a, and the absorption axis direction 154a. A direction tilted from a particular direction is a direction that differs from both a direction parallel to the particular direction and a direction perpendicular to the particular direction.

The planar shape of the polarizing plate 110a includes, as shown in FIG. 1, a side 158a extending in a direction perpendicular to the absorption axis direction 150a, a side 160a extending in a direction perpendicular to the slow axis direction 152a, and a side 162a extending in a direction tilted from both the absorption axis direction 150a and the slow axis direction 152a. The polarizing plate 110a includes a peripheral portion 166a lying along the side 158a, a peripheral portion 168a lying along the side 160a, and a peripheral portion 170a lying along the side 162a A corner portion 176a lies at a portion where the peripheral portion 166a and the peripheral portion 170a overlap each other, while a corner portion 178a lies at a portion where the peripheral portion 168a and the peripheral portion 170a overlap each other.

The peripheral portion 170a entirely protrudes from an area facing the main surface 144a of the liquid crystal cell 108a. Therefore, the peripheral portion 170a is not fixed by the adhesive 114a onto the main surface 144a of the liquid crystal cell 108a In addition, the corner portion 176a and the corner portion 178a respectively lying at edges of the peripheral portion 170a also each protrude from the area facing the main surface 144a of the liquid crystal cell 108a, and are not fixed by the adhesive 114a onto the main surface 144a of the liquid crystal cell 108a.

Other portions, than the peripheral portion 170a, of the polarizing plate 110a lie on the area facing the main surface 144a of the liquid crystal cell 108a, and are fixed by the adhesive 114a onto the main surface 144a of the liquid crystal cell 108a.

On the polarizing plate 110a, if a thermal shock is applied, the peripheral portion 166a, the peripheral portion 168a, and the peripheral portion 170a respectively would be likely to crack, where the peripheral portion 170a would be more likely to crack, and the corner portion 176a and the corner portion 178a that are regarded as singular points respectively would be highly likely to crack.

However, since, on the polarizing plate 110a, the peripheral portion 170a is not fixed onto the main surface 144a of the liquid crystal cell 108a, but lies freely, a stress will not fully be applied onto the peripheral portion 170a when a thermal shock is applied. In addition, since the corner portion 176a and the corner portion 178a respectively are not fixed onto the main surface 144a of the liquid crystal cell 108a, but lie freely, a stress will not fully be applied onto the corner portion 176a and the corner portion 178a respectively when a thermal shock is applied. Therefore, the peripheral portion 170a, which would be likely to crack when a thermal shock is applied, is prevented as much as possible from cracking. In addition, the corner portion 176a and the corner portion 178a, which would be highly likely to crack when a thermal shock is applied, are respectively prevented as much as possible from cracking. As a result, the polarizing plate 110a is prevented as much as possible from cracking when a thermal shock is applied during a thermal shock test or ordinary use.

The planar shape of the polarizing plate 112a includes, as shown in FIG. 2, a side 182a extending in a direction perpendicular to the absorption axis direction 154a, and a side 184a extending in a direction tilted from the absorption axis direction 154a. The polarizing plate 112a includes a peripheral portion 188a lying along the side 182a, and a peripheral portion 190a lying along the side 184a. A corner portion 194a lies at a portion where the peripheral portion 188a and the peripheral portion 190a overlap each other.

The peripheral portion 190a entirely protrudes from an area facing the other main surface 146a of the liquid crystal cell 108a. Therefore, the peripheral portion 190a is not fixed by the adhesive 116a onto the other main surface 146a of the liquid crystal cell 108a. In addition, the corner portion 194a lying at an edge of the peripheral portion 190a also protrudes from the area facing the other main surface 146a of the liquid crystal cell 108a, and is not fixed by the adhesive 116a onto the other main surface 146a of the liquid crystal cell 108a.

Other portions, than the peripheral portion 190a, of the polarizing plate 112a lie on the area facing the other main surface 146a of the liquid crystal cell 108a, and are fixed by the adhesive 116a onto the other main surface 146a of the liquid crystal cell 108a.

On the polarizing plate 112a, if a thermal shock is applied, the peripheral portion 188a and the peripheral portion 190a respectively would be likely to crack, where the peripheral portion 190a would be more likely to crack, and the corner portion 194a that is regarded as a singular point would be highly likely to crack.

However, since, on the polarizing plate 112a, the peripheral portion 190a is not fixed onto the other main surface 146a of the liquid crystal cell 108a, but lies freely, a stress will not fully be applied onto the peripheral portion 190a when a thermal shock is applied. In addition, since the corner portion 194a is not fixed onto the other main surface 146a of the liquid crystal cell 108a, but lies freely, a stress will not fully be applied onto the corner portion 194a when a thermal shock is applied. Therefore, the peripheral portion 190a which would be likely to crack when a thermal shock is applied, is prevented as much as possible from cracking. In addition, the corner portion 194a, which would be highly likely to crack when a thermal shock is applied, is prevented as much as possible from cracking. As a result, the polarizing plate 112a is prevented as much as possible from cracking when a thermal shock is applied during a thermal shock test or ordinary use.

With the liquid crystal, display 100a according to the first preferred embodiment, only the peripheral portion 170a of the polarizing plate 110a protrudes from the area facing the main surface 144a of the liquid crystal cell 108a. In addition, only the peripheral portion 190a of the polarizing plate 112a protrudes from the area facing the other main surface 146a of the liquid crystal cell 108a. As a result, areas of the portions protruding from the polarizing plate 110a and the polarizing plate 112a are minimal, which can prevent as much as possible a crack from occurring with a minimal frame area increase.

4 Second Preferred Embodiment

Figure 4:
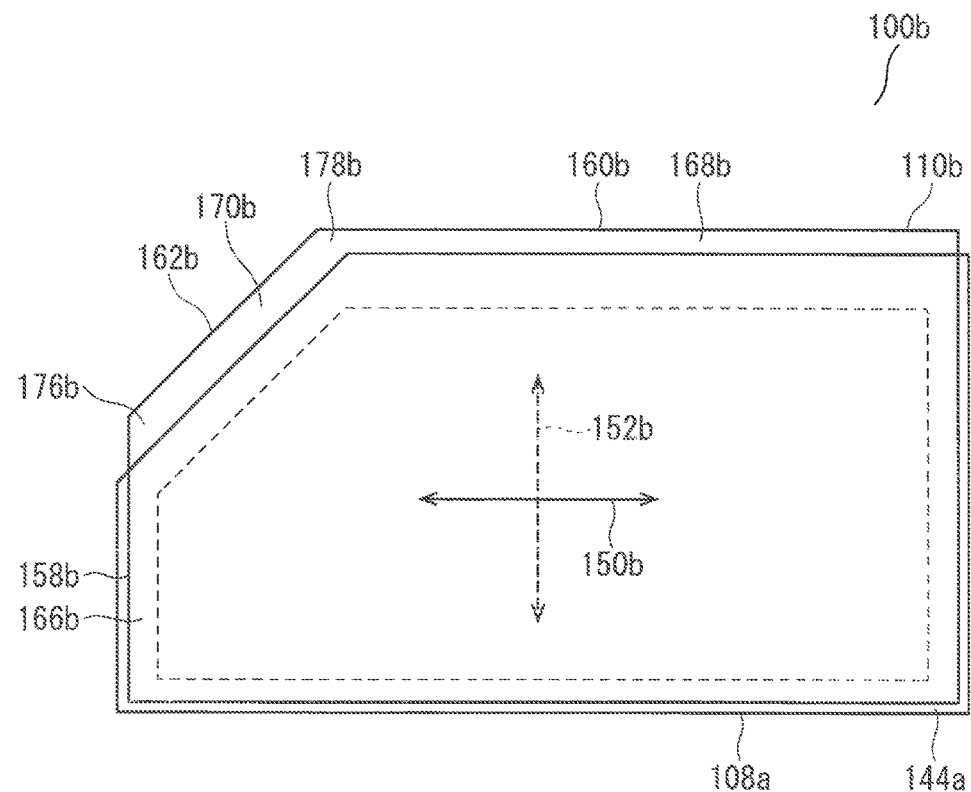
FIGS. 4 and 5 are plan views of a liquid crystal display according to a second preferred embodiment.
Figure 5:
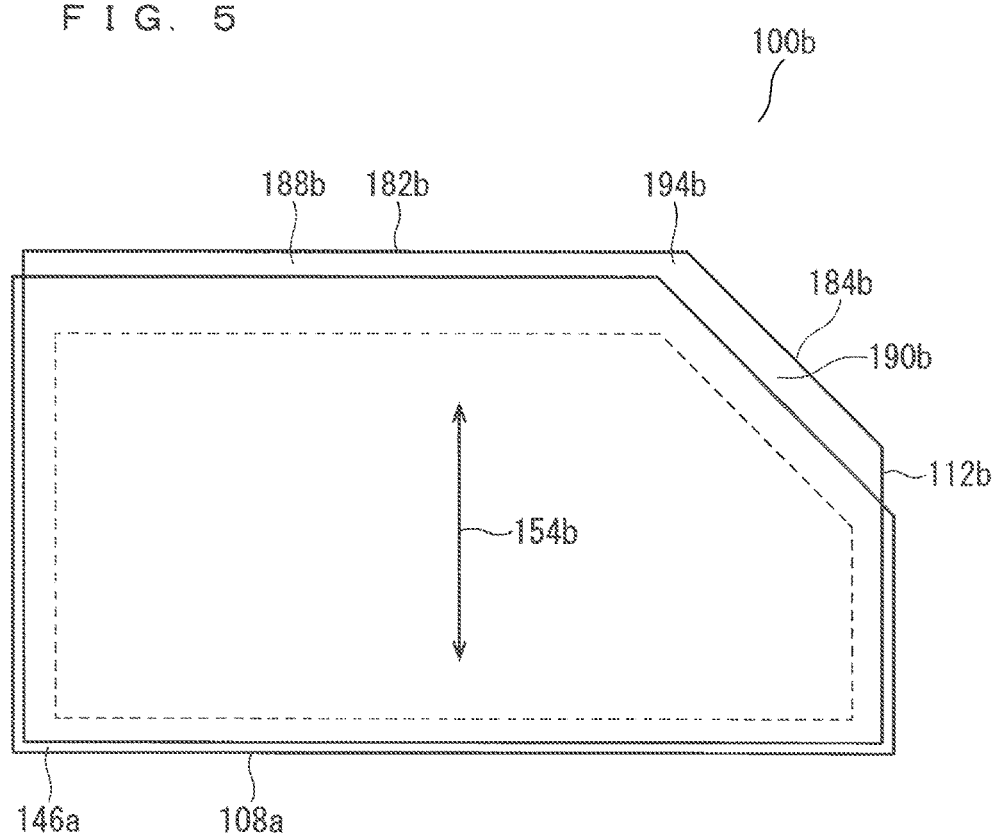

FIGS. 4 and 5 are schematic views of a liquid crystal display according to a second preferred embodiment. FIG. 4 is a plan view when viewed from a display face side, FIG. 5 is another plan view when viewed from a back face side.

In a liquid crystal display 100b shown in FIGS. 4 and 5, the polarizing plate 110a and the polarizing plate 112a included in the liquid crystal display 100a according to the first preferred embodiment are respectively replaced with a polarizing plate 110b and a polarizing plate 112b.

The polarizing plate 110b has, as shown in FIG. 4, similar to the polarizing plate 110a according to the first preferred embodiment, an absorption axis extending in an absorption axis direction 150b forming an angle of 0° with a width direction of the liquid crystal display 100b, and a slow axis extending in a slow axis direction 152b forming an angle of 90° with the width direction of the liquid crystal display 100b.

A planar shape of the polarizing plate 110b includes a side 158b extending in a direction perpendicular to the absorption axis direction 150b, a side 160b extending in a direction perpendicular to the slow axis direction 152b, and a side 162b extending in a direction tilted from both the absorption axis direction 150b and the slow axis direction 152b. The polarizing plate 110b includes a peripheral portion 166b lying along the side 158b, a peripheral portion 168b lying along the side 160b, and a peripheral portion 170b lying along the side 162b. A corner portion 176b lies at a portion where the peripheral portion 160 and the peripheral portion 170b overlap each other, while a corner portion 178b lies at a portion where the peripheral portion 168b and the peripheral portion 170b overlap each other.

The peripheral portion 170b entirely protrudes from an area facing the main surface 144a of the liquid crystal cell 108a. Therefore, the peripheral portion 170b is not fixed by the adhesive 114a onto the main surface 144a of the liquid crystal cell 108a. The corner portion 176b and the corner portion 178b respectively lying at edges of the peripheral portion 170b also each protrude from the area facing the main surface 144a of the liquid crystal cell 108a, and are not fixed by the adhesive 114a onto the main surface 144a of the liquid crystal cell 108a.

In the second preferred embodiment, the peripheral portion 168b also entirely, protrudes from the area facing the main surface 144a of the liquid crystal cell 108a. Therefore, the peripheral portion 168b is not fixed by the adhesive 114a onto the main surface 144a of the liquid crystal cell 108a.

Other portions, than the peripheral portion 168b and the peripheral portion 170b, of the polarizing plate 110b lie on the area facing the main surface 144a of the liquid crystal cell 108a, and are fixed by the adhesive 114a onto the main surface 144a of the liquid crystal cell 108a. The peripheral portion 166b may entirely protrude from the area facing the main surface 144a of the liquid crystal cell 108a.

On the polarizing plate 110b, if a thermal shock is applied, the peripheral portion 166b, the peripheral portion 168b, and the peripheral portion 170b respectively would be likely to crack, where the peripheral portion 170b would be more likely to crack, and the corner portion 176b and the corner portion 178b that are regarded as singular points respectively would be highly likely to crack. In addition, on the polarizing plate 110b, the peripheral portion 168h would be more likely to crack than the peripheral portion 166b. A reason of why the peripheral portion 168b would be more likely to crack than the peripheral portion 166b is that the phase difference film 122a lies closer to the liquid crystal cell 108a than the polarizing film 120a Since the phase difference film 122a is more susceptible to a thermal shock than the polarizing film 120a, a crack would be more likely to occur at a peripheral portion lying along a side perpendicular to the slow axis direction 152b than another peripheral portion lying along another side perpendicular to the absorption axis direction 150b.

However, since, on the polarizing plate 110b, the peripheral portion 168b and the peripheral portion 170b respectively are not fixed onto the main surface 144a of the liquid crystal cell 108a, but lie freely, a stress will not fully be applied onto the peripheral portion 168b and the peripheral portion 170b respectively when a thermal shock is applied. In addition, since the corner portion 176b and the corner portion 178b respectively are not fixed onto the main surface 144a of the liquid crystal cell 108a, but lie freely, a stress will not fully be applied onto the corner portion 176b and the corner portion 178b respectively when a thermal shock is applied. Therefore, the peripheral portion 168b, which would be relatively likely to crack when a thermal shock is applied, is prevented as much as possible from cracking. In addition, the peripheral portion 170b, which would be more likely to crack when a thermal shock is applied, is prevented as much as possible from cracking. In addition, the corner portion 176b and the corner portion 178b, which would be highly likely to crack when a thermal shock is applied, are respectively prevented as much as possible from cracking. As a result, the polarizing plate 110b is prevented as much as possible from cracking when a the al shock is applied during a thermal shock test or ordinary use.

The polarizing plate 112b has, as shown in FIG. 5, similar to the polarizing plate 112a according to the first preferred embodiment, an absorption axis extending in an absorption axis direction 154b forming an angle of 90° with the width direction of the liquid crystal display 100b.

A planar shape of the polarizing plate 112b includes a side 182b extending in a direction perpendicular to the absorption axis direction 154b, and a side 184b extending in a direction tilted from the absorption axis direction 154b. The polarizing plate 112b includes a peripheral portion 188b lying along the side 182b, and a peripheral portion 190b lying along the side 184b. A corner portion 194b lies at a portion where the peripheral portion 188b and the peripheral portion 190b overlap each other.

The peripheral portion 190b entirely protrudes from an area facing the other main surface 146a of the liquid crystal cell 108a. Therefore, the peripheral portion 190b is not fixed by the adhesive 116a onto the other main surface 146a of the liquid crystal cell 108a. In addition, the corner portion 194b lying at an edge of the peripheral portion 190b also protrudes from the area facing the other main surface 146a of the liquid crystal cell 108a, and is not fixed by the adhesive 116a onto the other main surface 146a of the liquid crystal cell 108a.

In the second preferred embodiment, the peripheral portion 188b also entirely protrudes from the area facing the other main surface 146a of the liquid crystal cell 108a. Therefore, the peripheral portion 188b is not fixed by the adhesive 116a onto the other main surface 146a of the liquid crystal cell 108a.

Other portions, than the peripheral portion 188b and the peripheral portion 190b, of the polarizing plate 112b lie on the area facing the other main surface 146a of the liquid crystal cell 108a, and are fixed by the adhesive 116a onto the other main surface 146a of the liquid crystal cell 108a.

On the polarizing plate 112b, if a thermal shock is applied, the peripheral portion 188b and the peripheral portion 190b respectively would be likely to crack, where the peripheral portion 190b would be more likely to crack, and the corner portion 194b that is regarded as a singular point would be highly likely to crack.

However, since, on the polarizing plate 112b, the peripheral portion 188b and the peripheral portion 190b respectively are not fixed onto the other main surface 146a of the liquid crystal cell 108a, but lie freely, a stress will not fully be applied onto the peripheral portion 188b and the peripheral portion 190b respectively when a thermal shock is applied. In addition, since the corner portion 194b is not fixed onto the other main surface 146a of the liquid crystal cell 108a, but lies freely, a stress will not fully be applied onto the corner portion 194b when a thermal shock is applied. Therefore, the peripheral portion 188b, which would be likely to crack when a thermal shock is applied, is prevented as much as possible from cracking. In addition, the peripheral portion 190b, which would be more likely to crack when a thermal shock is applied, is prevented as much as possible from cracking. In addition, the corner portion 194b, which would be highly likely to crack when a thermal shock is applied, is prevented as much as possible from cracking. As a result, the polarizing plate 112b is prevented as much as possible from cracking when a thermal shock is applied during a thermal shock test or ordinary use.

In the liquid crystal display 100b according to the second preferred embodiment, a portion of the polarizing plate 112b, which protrudes from the area facing the other main surface 146a of the liquid crystal cell 108a, overlaps with a portion of the polarizing plate 110b, which protrudes from the area facing the main surface 144a of the liquid crystal cell 108a. As a result, a crack can be prevented as much as possible from occurring with a minimal frame area increase.

5 Third Preferred Embodiment

Figure 6:
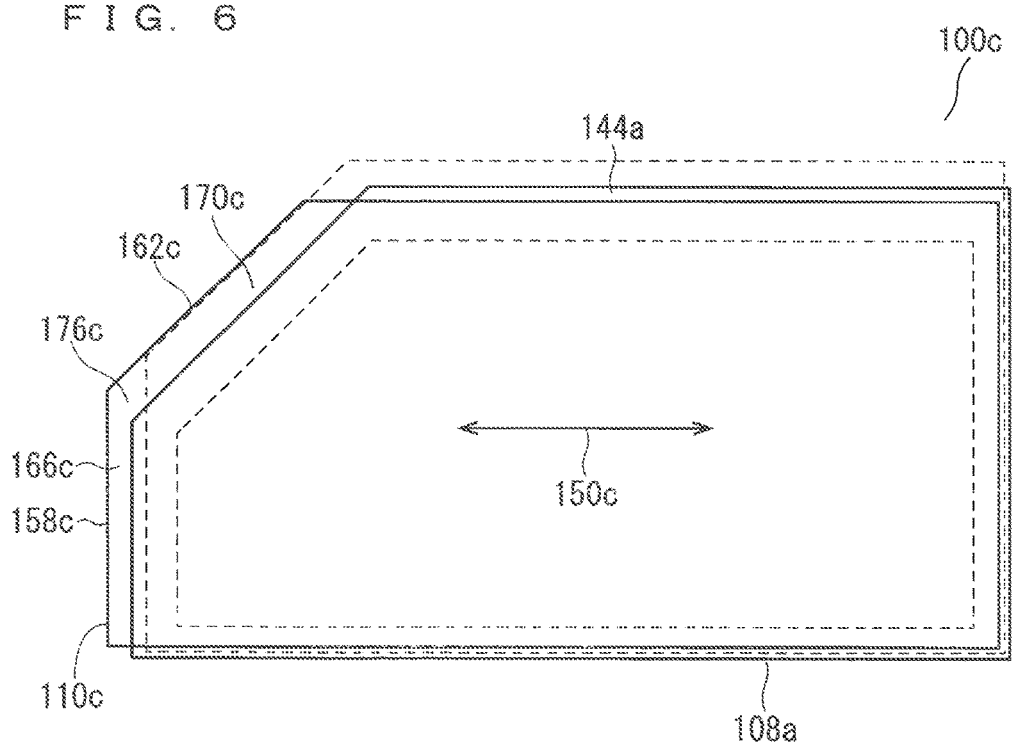
FIGS. 6 and 7 are plan views of a liquid crystal display according to a third preferred embodiment.
Figure 7:
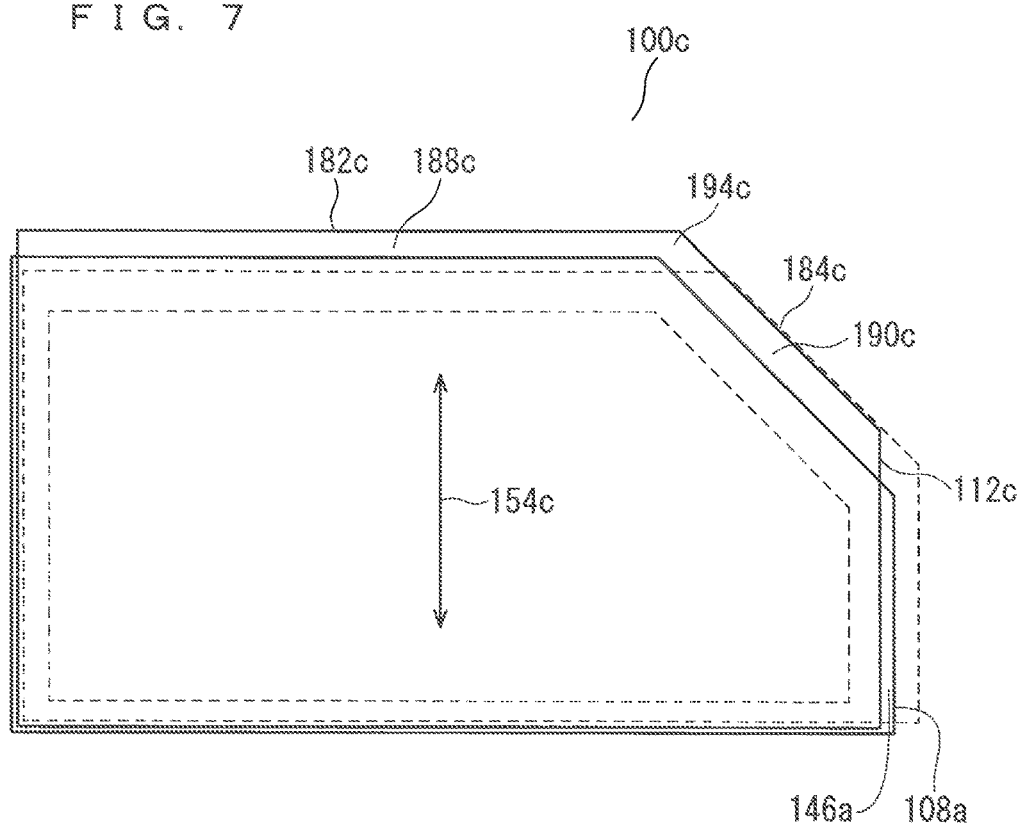

FIGS. 6 and 7 are schematic views of a liquid crystal display according to a third preferred embodiment. FIG. 6 is a plan view when viewed from a display face side. FIG. 7 is another plan view when viewed from a back face side.

In a liquid crystal display 100c shown in FIGS. 6 and 7, the polarizing plate 110a and the polarizing plate 112a included in the liquid crystal display 100a according to the first preferred embodiment are respectively replaced with a polarizing plate 110c and a polarizing plate 112c.

The polarizing plate 110c includes, similar to the polarizing plate 110a according to the first preferred embodiment, a polarizing film, but, different from the polarizing plate 110a according to the first preferred embodiment, no phase difference film. Accordingly, the polarizing plate 110c has, as shown in FIG. 6, similar to the polarizing plate 110a according to the first preferred embodiment, an absorption axis extending in an absorption axis direction 150c forming an angle of 0° with a width direction of the liquid crystal display 100c, but, different from the polarizing plate 110a according to the first preferred embodiment, no slow axis.

A planar shape of the polarizing plate 110e includes a side 158c extending in a direction perpendicular to the absorption axis direction 150c, and a side 162c extending in a direction tilted from the absorption axis direction 150c. The polarizing plate 110c includes a peripheral portion 166c lying along the side 158c, and a peripheral portion 170c lying along the side 162c. A corner portion 176c lies at a portion where the peripheral portion 166c and the peripheral portion 170c overlap each other.

The peripheral portion 170c entirely protrudes from an area facing the main surface 144a of the liquid crystal cell 108a. Therefore, the peripheral portion 170c is not fixed by the adhesive 114a onto the main surface 144a of the liquid crystal cell 108a In addition, the corner portion 176c lying at an edge of the peripheral portion 170c also protrudes from the area facing the main surface 144a of the liquid crystal cell 108a, and is not fixed by the adhesive 114a onto the main surface 144a of the liquid crystal cell 108a.

In the third preferred embodiment, the peripheral portion 166c also entirely protrudes from the area facing the main surface 144a of the liquid crystal cell 108a. Therefore, the peripheral portion 166c is not fixed by the adhesive 114a onto the main surface 144a of the liquid crystal cell 108a.

Other portions, than the peripheral portion 166c and the peripheral portion 170c, of the polarizing plate 110c lie on the area facing the main surface 144a of the liquid crystal cell 108a, and are fixed by the adhesive 114a onto the main surface 144a of the liquid crystal cell 108a.

On the polarizing plate 110c, if a thermal shock is applied, the peripheral portion 166c and the peripheral portion 170c respectively would be likely to crack, where the peripheral portion 170c would be more likely to crack, and the corner portion 176c that is regarded as a singular point would be highly likely to crack.

However, since, on the polarizing plate 110c, the peripheral portion 166c and the peripheral portion 170c respectively are not fixed onto the main surface 144a of the liquid crystal cell 108a, but lie freely, a stress will not fully be applied onto the peripheral portion 166c and the peripheral portion 170c respectively when a thermal shock is applied. In addition, since the corner portion 176c is not fixed onto the main surface 144a of the liquid crystal cell 108a, but lies freely, a stress will not fully be applied onto the corner portion 176c when a thermal shock is applied. Therefore, the peripheral portion 166c, which would be likely to crack when a thermal shock is applied, is prevented as much as possible from cracking. In addition, the peripheral portion 170c, which would be more likely to crack when a thermal shock is applied, is prevented as much as possible from cracking, and the corner portion 176c, which would be highly likely to crack when a thermal shock is applied, is prevented as much as possible from cracking. As a result, the polarizing plate 110c is prevented as much as possible from cracking when a thermal shock is applied during a thermal shock test or ordinary use.

The polarizing plate 112c has, as shown in FIG. 7, similar to the polarizing plate 112a according to the first preferred embodiment, an absorption axis extending in an absorption axis direction 154c forming an angle of 90° with the width direction of the liquid crystal display 100c.

A planar shape of the polarizing plate 112c includes a side 182c extending in a direction perpendicular to the absorption axis direction 154c, and a side 184c extending in a direction tilted from the absorption axis direction 154c. The polarizing plate 112c includes a peripheral portion 188c lying along the side 182c, and a peripheral portion 190c lying along the side 184c. A corner portion 194c lies at a portion where the peripheral portion 188c and the peripheral portion 190c overlap each other.

The peripheral portion 190c protrudes from an area facing the other main surface 146a of the liquid crystal cell 108a. Therefore, the peripheral portion 190c is not fixed by the adhesive 116a onto the other main surface 146a of the liquid crystal cell 108a, in addition, the corner portion 194c lying at an edge of the peripheral portion 190c also protrudes from the area facing the other main surface 146a of the liquid crystal cell 108a, and is not fixed by the adhesive 116a onto the other main surface 146a of the liquid crystal cell 108a.

In the third preferred embodiment, the peripheral portion 188c also protrudes from the area facing the other main surface 146a of the liquid crystal cell 108a. Therefore, the peripheral portion 188c is not fixed by the adhesive 116a onto the other main surface 146a of the liquid crystal cell 108a.

Other portions, than the peripheral portion 188c and the peripheral portion 190c, of the polarizing plate 112c lie on the area facing the other main surface 146a of the liquid crystal cell 108a, and are fixed by the adhesive 116a onto the other main surface 146a of the liquid crystal cell 108a.

On the polarizing plate 112c, if a thermal shock is applied, the peripheral portion 188c and the peripheral portion 190c respectively would be likely to crack, where the peripheral portion 190c would be more likely to crack, and the corner portion 194c that is regarded as a singular point would be highly likely to crack.

However, since, on the polarizing plate 112c, the peripheral portions 188c and 190c respectively are not fixed onto the other main surface 146a of the liquid crystal cell 108a, but lie freely, a stress will not fully be applied onto the peripheral portions 188c and 190c respectively when a thermal shock is applied. In addition, since the corner portion 194c is not fixed onto the other main surface 146a of the liquid crystal cell 108a, but lies freely, a stress will not fully be applied onto the corner portion 194c when a thermal shock is applied. Therefore, the peripheral portion 188c, which would be likely to crack when a thermal shock is applied, is prevented as much as possible from cracking. In addition, the peripheral portion 190c, which would be more likely to crack when a thermal shock is applied, is prevented as much as possible from cracking. In addition, the corner portion 194c, which would be highly likely to crack when a thermal shock is applied, is prevented as much as possible from cracking. As a result, the polarizing plate 112c is prevented as much as possible from cracking when a thermal shock is applied during a thermal shock test or ordinary use.

6 Fourth Preferred Embodiment

Figure 8:
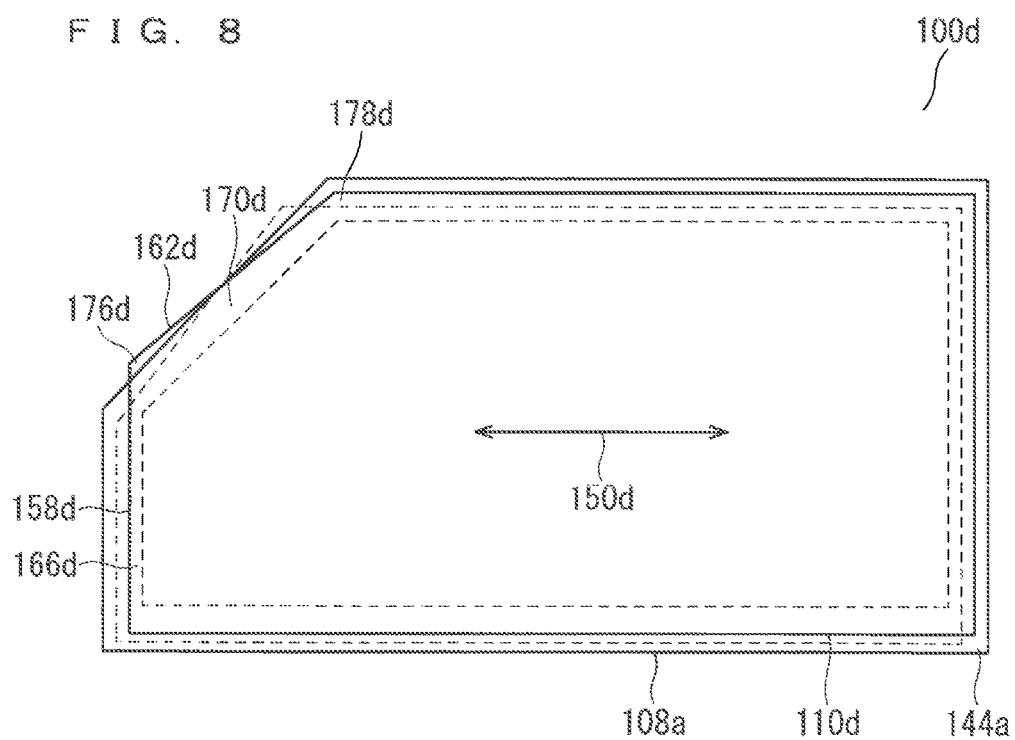
FIGS. 8 and 9 are plan views of a liquid crystal display according to a fourth preferred embodiment.
Figure 9:
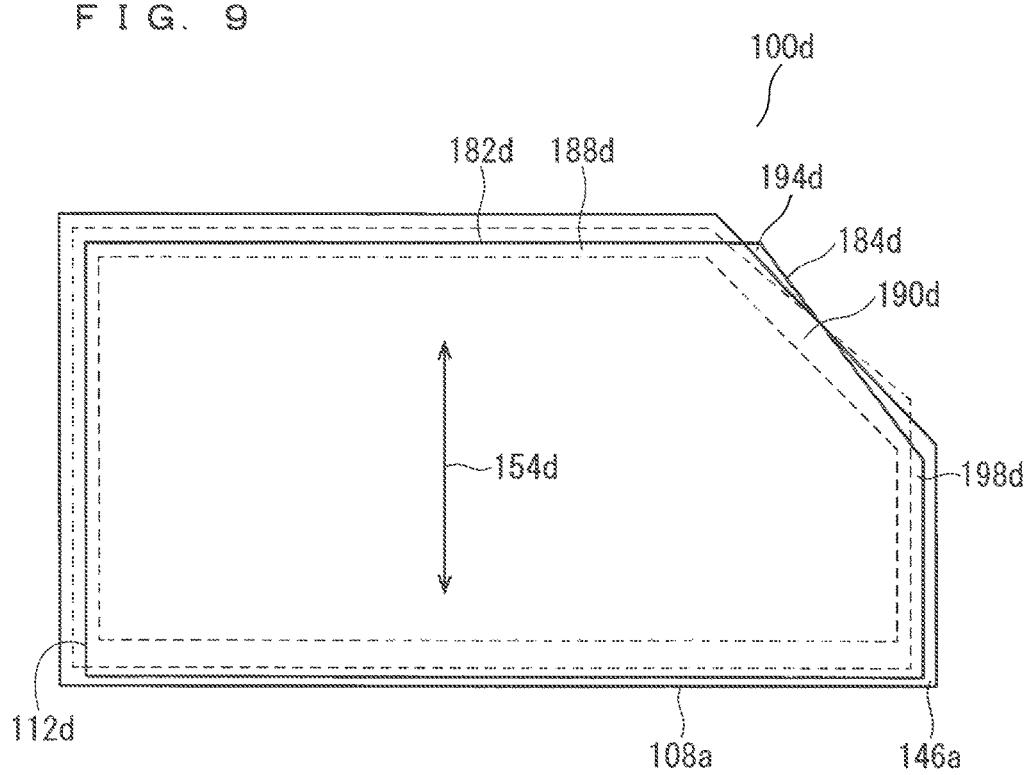

FIGS. 8 and 9 are schematic views of a liquid crystal display according to a fourth preferred embodiment. FIG. 8 is a plan view when viewed from a display face side. FIG. 9 is another plan view when viewed from a back face side.

In a liquid crystal display 100d shown in FIGS. 8 and 9, the polarizing plate 110a and the polarizing plate 112a included in the liquid crystal display 100a according to the first preferred embodiment are replaced with a polarizing plate 110d and a polarizing plate 112d.

The polarizing plate 110d includes, similar to the polarizing plate 110a according to the first preferred embodiment, a polarizing film, but, different from the polarizing plate 110a according to the first preferred embodiment, no phase difference film. Accordingly, the polarizing plate 110d has, as shown in FIG. 8, similar to the polarizing plate 110a according to the first preferred embodiment, an absorption axis extending in an absorption axis direction 150d forming an angle of 0° with a width direction of the liquid crystal display 100d, but, different from the polarizing plate 110a according to the first preferred embodiment, no slow axis.

A planar shape of the polarizing plate 110d includes a side 158d extending in a direction perpendicular to the absorption axis direction 150d, and a side 162d extending in a direction tilted from the absorption axis direction 150d, The polarizing plate 110d includes a peripheral portion 166d lying along the side 158d, and a peripheral portion 170d lying along the side 162d. A corner portion 176d lies at a portion where the peripheral portion 166d and the peripheral portion 170d overlap each other.

The corner portion 176d lying at an edge of the peripheral portion 170d protrudes from an area facing the main surface 144a of the liquid crystal cell 108a. Therefore, the corner portion 176d is not fixed by the adhesive 114a onto the main surface 144a of the liquid crystal cell 108a.

Other portions, than the corner portion 176d, of the polarizing plate 110d lie on the area acing the main surface 144a of the liquid crystal cell 108a, and are fixed by the adhesive 114a onto the main surface 144a of the liquid crystal cell 108a. Therefore, the corner portion 178d lying at another edge of the peripheral portion 170d lies on the area facing the main surface 144a of the liquid crystal cell 108a, and is fixed by the adhesive 114a onto the main surface 144a of the liquid crystal cell 108a.

On the polarizing plate 110d, if a thermal shock is applied, the peripheral portion 166d and the peripheral portion 170d respectively would be likely to crack, where the peripheral portion 170d would be more likely to crack, and the corner portion 176d that is regarded as a singular point would be highly likely to crack.

However, since, on the polarizing plate 110d, the corner portion 176d is not fixed onto the main surface 144a of the liquid crystal cell 108a, but lies freely, a stress will not fully be applied onto the corner portion 176d when a thermal shock is applied, Therefore, the corner portion 176, which would be highly likely to crack when a thermal shock is applied, is prevented as much as possible from cracking. As a result, the polarizing plate 110d is prevented as much as possible from cracking when a thermal shock is applied during a thermal shock test or ordinary use.

The polarizing plate 112d has, as shown in FIG. 9, similar to the polarizing plate 112a according to the first preferred embodiment, an absorption axis extending in an absorption axis direction 154d forming an angle of 90° with the width direction f the liquid crystal display 100d.

A planar shape of the polarizing plate 112d includes a side 182d extending in a direction perpendicular to the absorption axis direction 154d, and a side 184d extending in a direction tilted from the absorption axis direction 154d. The polarizing plate 112d includes a peripheral portion 188d lying along the side 182d, and a peripheral portion 190d lying along the side 184d. A corner portion 194d lies at a portion where the peripheral portion 188d and the peripheral portion 190d overlap each other.

The corner portion 194d lying at an edge of the peripheral portion 190d protrudes from an area facing the other main surface 146a of the liquid crystal cell 108a. Therefore, the corner portion 194d is not fixed by the adhesive 116a onto the other main surface 146a of the liquid crystal cell 108a.

Other portions, than the corner portion 194d, of the polarizing plate 112d lie on the area facing the other main surface 146a of the liquid crystal cell 108a, and are fixed by the adhesive 116a onto the other main surface 146a of the liquid crystal cell 108a. Therefore, the corner portion 198d lying at another edge of the peripheral portion 190d lies on the area facing the other main surface 146a of the liquid crystal cell 108a, and is fixed by the adhesive 116a onto the other main surface 146a of the liquid crystal cell 108a.

In the liquid crystal display 100d according to the fourth preferred embodiment, only the corner portion 176d of the polarizing plate 110d protrudes from the area facing the main surface 144a of the liquid crystal cell 108a, while only the corner portion 194d of the polarizing plate 112d protrudes from the area facing the other main surface 146a of the liquid crystal cell 108a. As a result, areas of the portions protruding from the polarizing plate 110d and the polarizing plate 112d are minimal, which can prevent as much as possible a crack from occurring with a minimal frame area increase.

7 Fifth Preferred Embodiment

Figure 10:
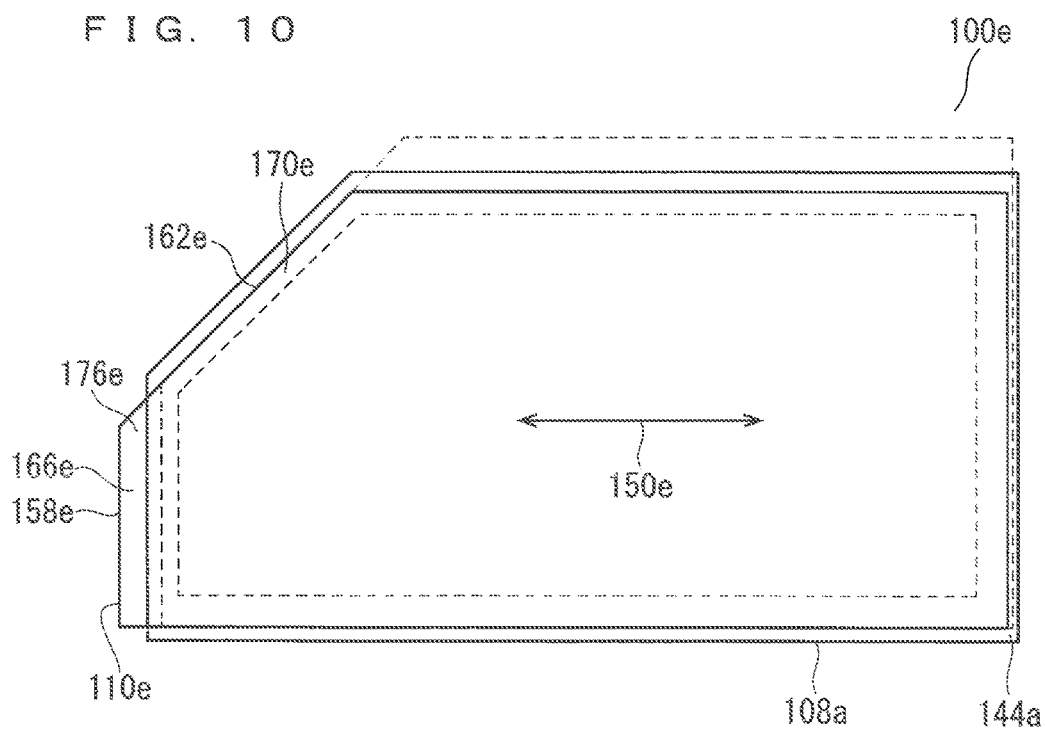
FIGS. 10 and 11 are plan views of a liquid crystal display according to a fifth preferred embodiment.
Figure 11:
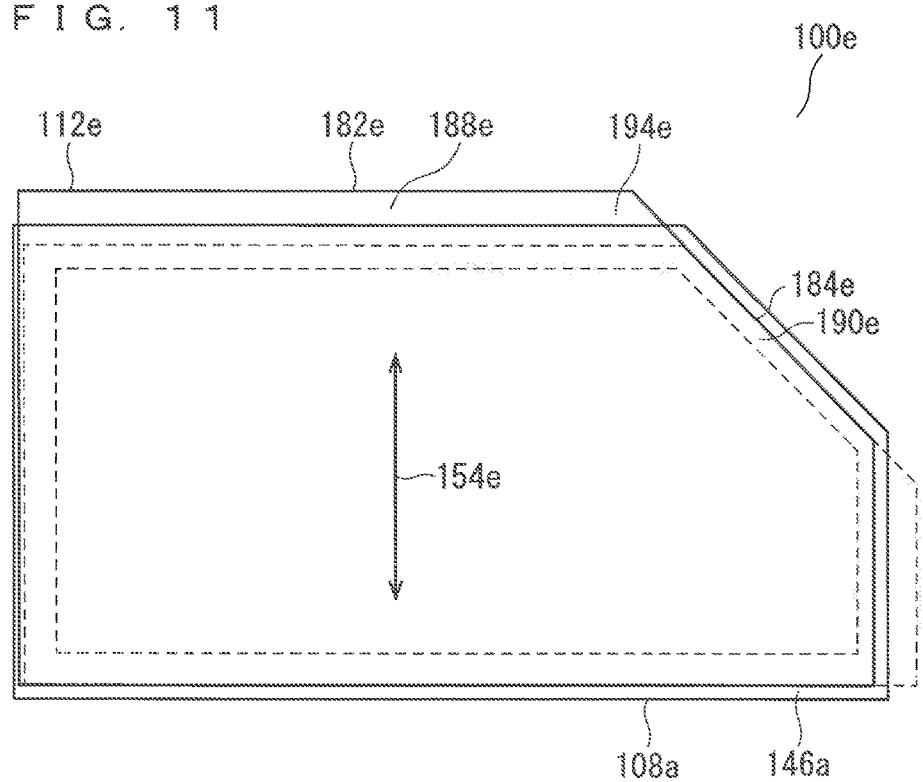

FIGS. 10 and 11 are schematic views of a liquid crystal display according to a fifth preferred embodiment. FIG. 10 is a plan view when viewed from a display face side. FIG. 11 is another plan view when viewed from a back face side.

In a liquid crystal display 100e shown in FIGS. 10 and 11, the polarizing plate 110a and the polarizing plate 112a included in the liquid crystal display 100a according to the first preferred embodiment are respectively replaced with a polarizing plate 110e and a polarizing plate 112e.

The polarizing plate 110e includes, similar to the polarizing plate 110a according to the first preferred embodiment, a polarizing film, but, different from the polarizing plate 110a according to the first preferred embodiment, no phase difference film. Accordingly, the polarizing plate 110e has, as shown in FIG. 10, similar to the polarizing plate 110a according to the first preferred embodiment, an absorption axis extending in an absorption axis direction 150e forming an angle of 0° with a width direction of the liquid crystal display 100e, but, different from the polarizing plate 110a according to the first preferred embodiment, no slow axis.

A planar shape of the polarizing plate 110e includes a side 158e extending in a direction perpendicular to the absorption axis direction 150e, and a side 162e extending in a direction tilted from the absorption axis direction 150e. The polarizing plate 110e includes a peripheral portion 166e lying along the side 158e, and a peripheral portion 170e lying along the side 162e. A corner portion 176e lies at a portion where the peripheral portion 166e and the peripheral portion 170e overlap each other.

The peripheral portion 166e entirely protrudes from an area facing the main surface 144a of the liquid crystal cell 108a. Therefore, the peripheral portion 166e is not fixed by the adhesive 114a onto the main surface 144a of the liquid crystal cell 108a In addition, the corner portion 176e lying at an edge of the peripheral portion 166e also protrudes from the area facing the main surface 144a of the liquid crystal cell 108a, and is not fixed by the adhesive 114a onto the main surface 144a of the liquid crystal cell 108a.

Other portions, than the peripheral portion 166e, of the polarizing plate 110e lie on the area facing the main surface 144a of the liquid crystal cell 108a, and are fixed by the adhesive 114a onto the main surface 144a of the liquid crystal cell 108a. Therefore, other portions, than the corner portion 176e of the peripheral portion 170e lie the area facing the main surface 144a of the liquid crystal cell 108a, and are fixed by the adhesive 114a onto the main surface 144a of the liquid crystal cell 108a.

On the polarizing plate 110e, if a thermal shock is applied, the peripheral portion 166e and the peripheral portion 170e respectively would be likely to crack, where the peripheral portion 170e would be more likely to crack, and the corner portion 176e that is regarded as a singular point would be highly likely to crack. However, since, on the polarizing plate 110e, the peripheral portion 166e is not fixed onto the main surface 144a of the liquid crystal cell 108a, but lies freely, a stress will not fully be applied onto the peripheral portion 166e when a thermal shock is applied. In addition, since the corner portion 176e is not fixed onto the main surface 144a of the liquid crystal cell 108a, but lies freely, a stress will not fully be applied onto the corner portion 176e when a thermal shock is applied. Therefore, the peripheral portion 166e, Which would be likely to crack when a thermal shock is applied, is prevented as much as possible from cracking. In addition the corner portion 176e, which would be highly likely to crack when a thermal shock is applied, is prevented as much as possible from cracking. As a result, the polarizing plate 110e is prevented as much as possible from cracking when a thermal shock is applied during a thermal shock test or ordinary use.

The polarizing plate 112e has, as shown in FIG. 11, similar to the polarizing plate 112a according to the first preferred embodiment, an absorption axis extending in an absorption axis direction 154e forming an angle of 90° with the width direction of the liquid crystal display 100e.

A planar shape of the polarizing plate 112e includes a side 182e extending in a direction perpendicular to the absorption axis direction 154e, and a side 184e extending in a direction tilted from the absorption axis direction 154e, The polarizing plate 112e includes a peripheral portion 188e lying along the side 182e, and a peripheral portion 190e lying along the side 184e. A corner portion 194e lies at a portion where the peripheral portion 188e and the peripheral portion 190e overlap each other.

The peripheral portion 188e entirely protrudes from an area facing the other main surface 146a of the liquid crystal cell 108a. Therefore, the peripheral portion 188c is not fixed by the adhesive 116a onto the other main surface 146a of the liquid crystal cell 108a. In addition, the corner portion 194e lying at an edge of the peripheral portion 188e also protrudes from the area facing the other main surface 146a of the liquid crystal cell 108a, and is not fixed by the adhesive 116a onto the other main surface 146a of the liquid crystal cell 108a.

Other portions, than the peripheral portion 188e, of the polarizing plate 112e lie on the area facing the other main surface 146a of the liquid crystal cell 108a, and are fixed by the adhesive 116a onto the other main surface 146a of the liquid crystal cell 108a. Therefore, other portions, than the corner portion 194e of the peripheral portion 190e, lie on the area facing the other main surface 146a of the liquid crystal cell 108a, and are fixed by the adhesive 116a onto the other main surface 146a of the liquid crystal cell 108a.

On the polarizing plate 112e, if a thermal shock is applied, the peripheral portion 188e and the peripheral portion 190e respectively would be likely to crack, where the peripheral portion 190e would be more likely to crack, and the corner portion 194e that is regarded as a singular point would be highly likely to crack.

However, since, on the polarizing plate 112e, the peripheral portion 188e is not fixed onto the main surface 144a of the liquid crystal cell 108a, but lies freely, a stress will not fully be applied onto the peripheral portion 188e when a thermal shock is applied. In addition, since the corner portion 194e is not fixed onto the main surface 144a of the liquid crystal cell 108a, but lies freely, a stress will not fully be applied onto the corner portion 194e when a thermal shock is applied. Therefore, the peripheral portion 188e, which would be likely to crack when a thermal shock is applied, is prevented as much as possible from cracking. In addition, the corner portion 194e, which would be highly likely to crack when a thermal shock is applied, is prevented as much as possible from cracking. As a result, the polarizing plate 112e is prevented as much as possible from cracking when a thermal shock is applied during a thermal shock test or ordinary use.

In the liquid crystal display 100e according to the fifth preferred embodiment, only the peripheral portion 166e of the polarizing plate 110e protrudes from the area facing the main surface 144a of the liquid crystal cell 108a, while only the peripheral portion 188e of the polarizing plate 112e protrudes from the area facing the other main surface 146a of the liquid crystal cell 108a. As a result, areas of the portions protruding from the polarizing plate 110e and the polarizing plate 112e are minimal, which can prevent as much as possible a crack from occurring with a minimal frame area increase.

8 Sixth Preferred Embodiment

Figure 12:
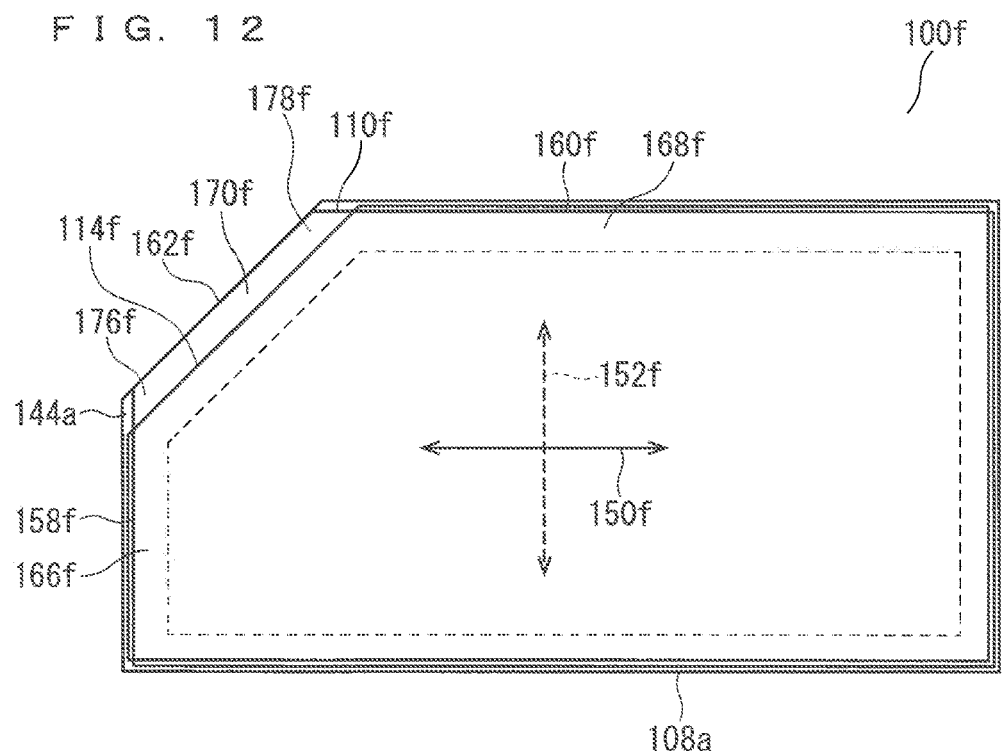
FIG. 12 is a plan view of a liquid crystal display according to a sixth preferred embodiment.

FIG. 12 is a schematic view of a liquid crystal display according to a sixth preferred embodiment. FIG. 12 is a plan view when viewed from a display face side.

In a liquid crystal display 100f shown in FIG. 12, the polarizing plate 110a and the polarizing plate 112a included in the liquid crystal display 100a according to the first preferred embodiment are respectively replaced with a polarizing plate 110f and another polarizing plate (not shown), as well as the adhesive 114a and the adhesive 116a used in the liquid crystal display 100a according to the first preferred embodiment are respectively replaced with an adhesive 114f and another adhesive (not shown).

The polarizing plate 110f has, similar to the polarizing plate 110a according to the first preferred embodiment, an absorption axis extending in an absorption axis direction 150f forming an angle of 0° with a width direction of the liquid crystal display 100f, and a slow axis extending in a slow axis direction 152f forming an angle of 90° with the width direction of the liquid crystal display 100f.

A planar shape of the polarizing plate 110f includes a side 158f extending in a direction perpendicular to the absorption axis direction 150f, a side 160f extending in a direction perpendicular to the slow axis direction 152f, and a side 162f extending in a direction tilted from both the absorption axis direction 150f and the slow axis direction 152f. The polarizing plate 110f includes a peripheral portion 166f lying along the side 158f, a peripheral portion 168f lying along the side 160f, and a peripheral portion 170f lying along the side 162f. A corner portion 176f lies at a portion where the peripheral portion 166f and the peripheral portion 170f overlap each other, while a corner portion 178f lies at a portion where the peripheral portion 168f and the peripheral portion 170f overlap each other.

The polarizing plate 110f entirely lies on an area facing the main surface 144a of the liquid crystal cell 108a. Therefore, the peripheral portion 170f entirely lies on the area facing the main surface 144a of the liquid crystal cell 108a. However, the adhesive 114f is not disposed between the peripheral portion 170f and the liquid crystal cell 108a. Therefore, the peripheral portion 170f is not fixed by the adhesive 114f onto the main surface 144a of the liquid crystal cell 108a. In addition, the corner portion 176f and the corner portion 178f respectively lying at edges of the peripheral portion 170f are not fixed by the adhesive 114f onto the main surface 144a of the liquid crystal cell 108a.

On the polarizing plate 110f, if a thermal shock is applied, the peripheral portion 166f, the peripheral portion 168f, and the peripheral portion 170f respectively would be likely to crack, where the peripheral portion 170f would be more likely to crack, and the corner portion 176f and the corner portion 178f that are regarded as singular points respectively would be highly likely to crack.

However, since, on the polarizing plate 110f, the peripheral portion 170f is not fixed onto the main surface 144a of the liquid crystal cell 108a, but lies freely, a stress will not fully be applied onto the peripheral portion 170f when a thermal shock is applied. In addition, since the corner portion 176f and the corner portion 178f respectively are not fixed onto the main surface 144a of the liquid crystal cell 108a, but lie freely, a stress will not fully be applied onto the corner portion 176f and the corner portion 178f respectively when a thermal shock is applied. Therefore, the peripheral portion 170f, which would be more likely to crack when a thermal shock is applied, is prevented as much as possible from cracking. In addition, the corner portion 176f and the corner portion 178f, which would be highly likely to crack when a thermal shock is applied, are respectively prevented as much as possible from cracking. As a result, the polarizing plate 110f is prevented as much as possible from cracking when a thermal shock is applied during a thermal shock test or ordinary use.

On the other polarizing plate applied to the other main surface 146a of the liquid crystal cell 108a, an adhesive is also not disposed between a peripheral portion lying along a side extending in a direction tilted from an absorption axis direction and the other main surface 146a of the liquid crystal cell 108a. Thus, neither the peripheral potion is fixed to the other main surface 146a of the liquid crystal cell 108a, nor corner portions lying at edges of the peripheral portion are fixed to the other main surface 146a of the liquid crystal cell 108a.

In the liquid crystal display 100f according to the sixth preferred embodiment, neither the polarizing plate 110f protrudes from the main surface 144a of the liquid crystal cell 108a nor the other polarizing plate (not shown) protrudes from the other main surface 146a of the liquid crystal cell 108a. As a result, a crack can be prevented as much as possible from occurring with a minimal frame area increase.

A modification may be applied in the second to fifth preferred embodiments so that, by not using an adhesive between a peripheral portion and one of the main surfaces of the liquid crystal cell 108a, the peripheral portion is not fixed onto the main surface of the liquid crystal cell 108a. A seventh preferred embodiment describes a case when the second preferred embodiment has been modified as described above.

9 Seventh Preferred Embodiment

Figure 13:
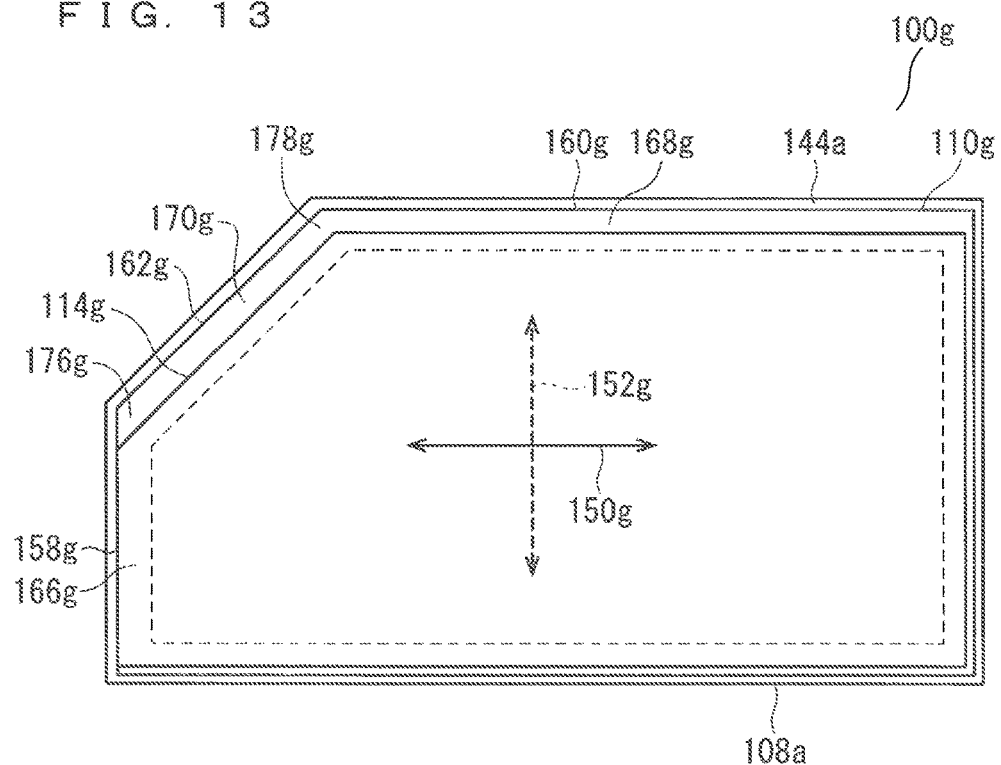
FIG. 13 is a plan view of a liquid crystal display according to a seventh preferred embodiment.

FIG. 13 is a schematic view of a liquid crystal display according to the seventh preferred embodiment. FIG. 13 is a plan view when viewed from a display face side.

In a liquid crystal display 100g shown in FIG. 13, the polarizing plate 110a and the polarizing plate 112a included in the liquid crystal display 100a according to the first preferred embodiment are respectively replaced with a polarizing plate 110g and another polarizing plate (not shown), as well as the adhesive 114a and the adhesive 116a used in the liquid crystal display 100a according to the first preferred embodiment are respectively replaced with an adhesive 114g and another adhesive (not shown).

The polarizing plate 110g has, similar to the polarizing plate 110a according to the first preferred embodiment, an absorption axis extending in an absorption axis direction 150g forming an angle of 0° with a width direction of the liquid crystal display 100g, and a slow axis extending in a slow axis direction 152g forming an angle of 90° with the width direction of the liquid crystal display 100g.

A planar shape of the polarizing plate 110g includes a side 158g extending in a direction perpendicular to the absorption axis direction 150g, a side 160g extending in a direction perpendicular to the slow axis direction 152g, and a side 162g extending in a direction tilted from both of the absorption axis direction 150g and the slow axis direction 152g. The polarizing plate 110g includes a peripheral portion 166g lying along the side 158g, a peripheral portion 168g lying along the side 160g, and a peripheral portion 170g lying along the side 162g. A corner portion 176g lies at a portion where the peripheral portion 166g and the peripheral portion 170g overlap each other, while a corner portion 178g lies at a portion where the peripheral portion 168g and the peripheral portion 170g overlap each other.

The polarizing plate 110g entirely lies on an area facing the main surface 144a of the liquid crystal cell 108a.

The peripheral portion 170g entirely lies on the area facing the main surface 144a of the liquid crystal cell 108a. However, the adhesive 114g is not disposed between the peripheral portion 170g and the main surface 144a of the liquid crystal cell 108a. Therefore, the peripheral portion 170g is not fixed by the adhesive 114g onto the main surface 144a of the liquid crystal cell 108a. In addition, the corner portion 176g and the corner portion 178g respectively lying at edges of the peripheral portion 170g lie on the area facing the main surface 144a of the liquid crystal cell 108a, and are not fixed by the adhesive 114g onto the main surface 144a of the liquid crystal cell 108a.

The peripheral portion 168g entirely lies on the area facing the main surface 144a of the liquid crystal cell 108a. However, the adhesive 114g is not disposed between the peripheral portion 168g and the main surface 144a of the liquid crystal cell 108a. Therefore, the peripheral portion 168g is not fixed by the adhesive 114g onto the main surface 144a of the liquid crystal cell 108a.

On the polarizing plate 110g, if a thermal shock is applied, the peripheral portion 166g, the peripheral portion 168g, and the peripheral portion 170g respectively would be likely to crack, where the peripheral portion 170g would be more likely to crack, and the corner portion 176g and the corner portion 178g that are regarded as singular points would be highly likely to crack. In addition, on the polarizing plate 110g, the peripheral portion 168g would be more likely to crack than the peripheral portion 166g.

However, since, on the polarizing plate 110g, the peripheral portion 168g and the peripheral portion 170g respectively are not fixed onto the main surface 144a of the liquid crystal cell 108a, but lie freely, a stress will not fully be applied onto the peripheral portion 168g and the peripheral portion 170g respectively when a thermal shock is applied. In addition, since the corner portion 176g and the corner portion 178g respectively are not fixed onto the main surface 144a of the liquid crystal cell 108a, but lie freely, a stress will not fully be applied onto the corner portion 176g and the corner portion 178g respectively when a thermal shock is applied. Therefore, the peripheral portion 168g, which would be relatively likely to crack when a thermal shock is applied, is prevented as much as possible from cracking. In addition, the peripheral portion 170g, which would be more likely to crack when a thermal shock is applied, is prevented as much as possible from cracking. In addition, the corner portion 176g and the corner portion 178g, which would be highly likely to crack when a thermal shock is applied, are respectively prevented as much as possible from cracking. As a result, the polarizing plate 110g is prevented as much as possible from cracking when a thermal shock is applied during a thermal shock test or ordinary use.

On the other polarizing plate applied onto the other main surface 146a of the liquid crystal cell 108a, an adhesive is also not disposed between an entire peripheral portion lying along a side extending in a direction perpendicular to an absorption axis direction and the other main surface 146a of the liquid crystal cell 108a. Therefore, the other peripheral portion is not fixed onto the other main surface 146a of the liquid crystal cell 108a. In addition, an adhesive is not disposed between an entire peripheral portion lying along a side extending in a direction tilted from the absorption axis direction and the other main surface 146a of the liquid crystal cell 108a. Therefore, the peripheral portion is not fixed onto the other main surface 146a of the liquid crystal cell 108a, as well as corner portions lying at edges of the peripheral portion are not fixed onto the other main surface 146a of the liquid crystal cell 108a.

In the liquid crystal display 100g according to the seventh preferred embodiment, neither the polarizing plate 110g protrudes from the main surface 144a of the liquid crystal cell 108a, nor the other polarizing plate (not shown) protrudes from the other main surface 146a of the liquid crystal cell 108a. As a result, a crack can be prevented as much as possible from occurring with a minimal frame area increase.

10 Eighth Preferred Embodiment

Figure 14:
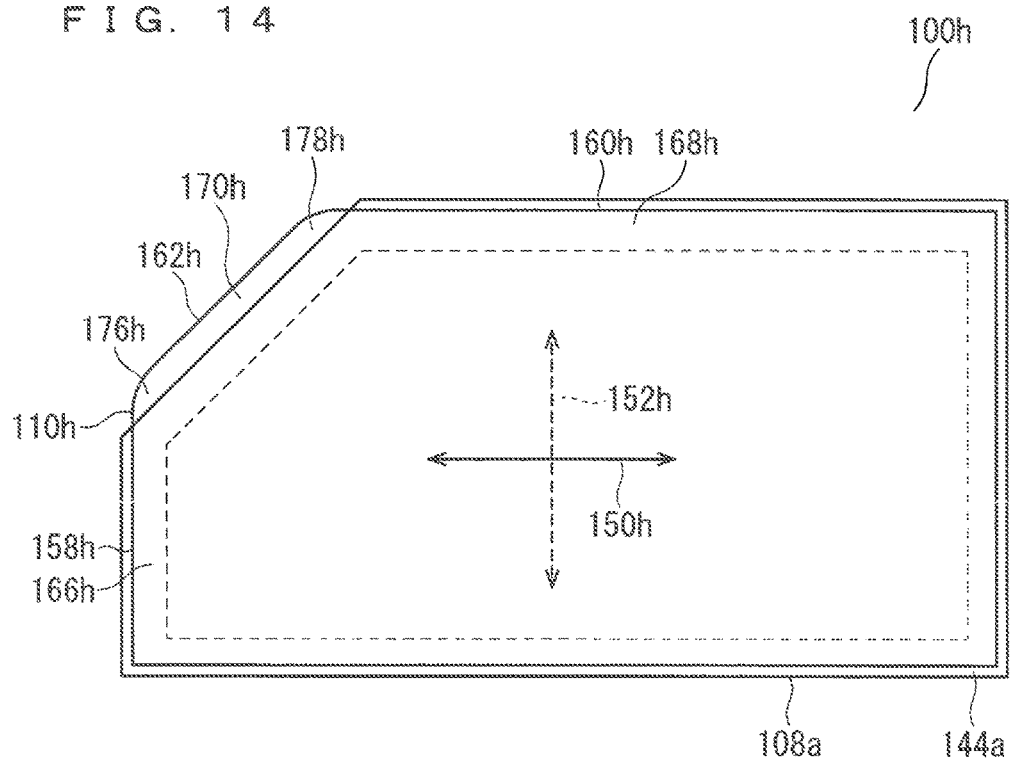
FIGS. 14 and 15 are plan views of a liquid crystal display according to an eighth preferred embodiment.
Figure 15:
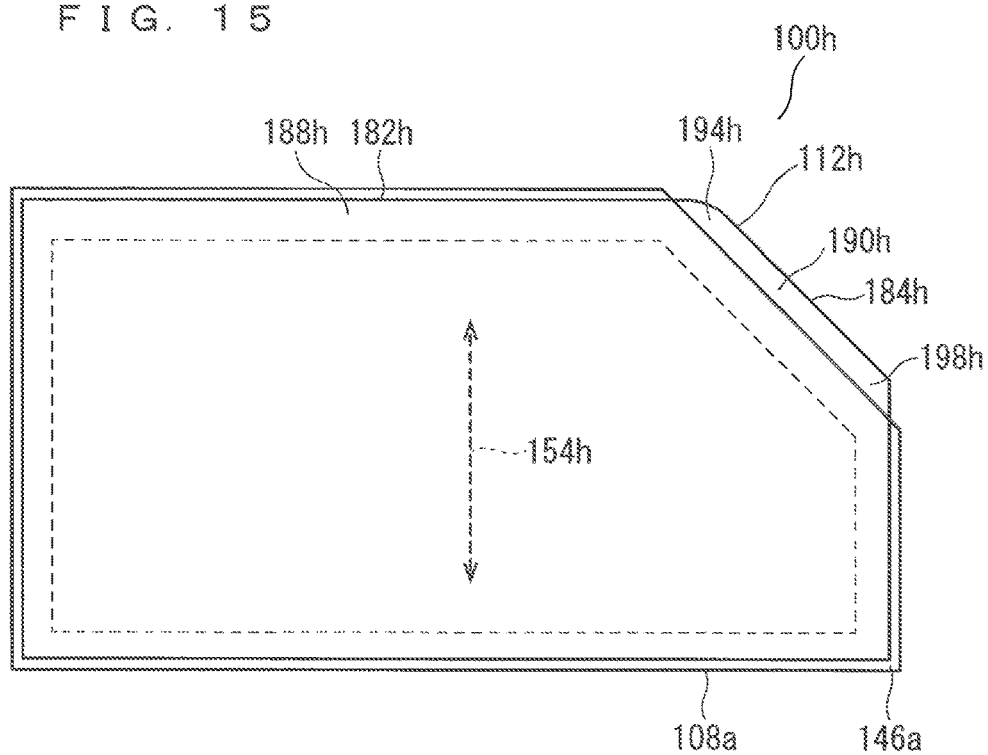

FIGS. 14 and 15 are schematic views of a liquid crystal display according to an eighth preferred embodiment. FIG. 14 is a plan view when viewed from a display face side. FIG. 15 is another plan view when viewed from a back face side.

In a liquid crystal display 100h shown in FIGS. 14 and 15, the polarizing plate 110a and the polarizing plate 112a included in the liquid crystal display 100a according to the first preferred embodiment are replaced with a polarizing plate 110h and a polarizing plate 112h were respective corner portions have been rounded.

The polarizing plate 110h has, as shown in FIG. 14, similar to the polarizing plate 110a according to the first preferred embodiment, an absorption axis extending in an absorption axis direction 150h forming an angle of 0° with a width direction of the liquid crystal display 100h, and a slow axis extending in a slow axis direction 152h forming an angle of 90° with the width direction of the liquid crystal display 100h.

A planar shape of the polarizing plate 110h includes a side 158h extending in a direction perpendicular to the absorption axis direction 150h, a side 160h extending in a direction perpendicular to the slow axis direction 152h, and a side 162h extending in a direction tilted from both of the absorption axis direction 150h and the slow axis direction 152h. The polarizing plate 110h includes a peripheral portion 166h lying along the side 158h, a peripheral portion 168h lying along the side 160h, and a peripheral portion 170h lying along the side 162h. A corner portion 176h lies at a portion where the peripheral portion 166h and the peripheral portion 170h overlap each other, while a corner portion 178h lies at a portion where the peripheral portion 168h and the peripheral portion 170h overlap each other.

The peripheral portion 170h entirely protrudes from an area facing the main surface 144a of the liquid crystal cell 108a. Therefore, the peripheral portion 170h is not fixed by the adhesive 114a onto the main surface 144a of the liquid crystal cell 108a. In addition, the corner portion 176h and the corner portion 178h respectively lying at edges of the peripheral portion 170h also protrude from the area facing the main surface 144a of the liquid crystal cell 108a, and are not fixed by the adhesive 114a onto the main surface 144a of the liquid crystal cell 108a.

In the eighth preferred embodiment, the side 158h joins, via a circular arc curve, to the side 162h to round the corner portion 176h. In addition, the side 160h joins, via a circular arc curve, to the side 162h to round the corner portion 178h.

On the polarizing plate 110h, if a thermal shock is applied, the peripheral portion 166h, the peripheral portion 168h, and the peripheral portion 170h would be likely to crack, where the peripheral portion 170h would be more likely to crack, and the corner portion 176h and the corner portion 178h that are regarded as singular points would be highly likely to crack. In addition, on the polarizing plate 110h, the peripheral portion 168h would be more likely to crack than the peripheral portion 166h.

However, since, on the polarizing plate 110h, the peripheral portion 170h is not fixed onto the main surface 144a of the liquid crystal cell 108a, but lies freely, a stress will not fully be applied onto the peripheral portion 170h when a thermal shock is applied. In addition, since the corner portion 176h and the corner portion 178h respectively are not fixed onto the main surface 144a of the liquid crystal cell 108a, but lie freely, a stress will not fully be applied onto the corner portion 176h and the corner portion 178h respectively when a thermal shock is applied. Therefore, the peripheral portion 168h, which would be relatively likely to crack when a thermal shock is applied, is prevented as much as possible from cracking. In addition, the peripheral portion 170h, which would be more likely to crack when a thermal shock is applied, is prevented as much as possible from cracking. In addition, the corner portion 176h and the corner portion 178h, which would be highly likely to crack when a thermal shock is applied, are respectively prevented as much as possible from cracking. As a result, the polarizing plate 110h is prevented as much as possible from cracking when a thermal shock is applied during a thermal shock test or ordinary use. Since the corner portion 176h and the corner portion 178h respectively are rounded, the corner portion 176h and the corner portion 178h respectively are further prevented as much as possible from cracking.

The polarizing plate 112h has, as shown in FIG. 15, similar to the polarizing plate 112a according to the first preferred embodiment, an absorption axis extending in an absorption axis direction 154h forming an angle of 90° with the width direction of the liquid crystal display 100h.

A planar shape of the polarizing plate 112h includes a side 182h extending in a direction perpendicular to the absorption axis direction 154h, and a side 184h extending in a direction tilted from the absorption axis direction 154h. The polarizing plate 112h includes a peripheral portion 188h lying along the side 182h, and a peripheral portion 190h lying along the side 184h. A corner portion 194h lies at a portion where the peripheral portion 188h and the peripheral portion 190h overlap each other.

The peripheral portion 190h protrudes from an area facing the other main surface 146a of the liquid crystal cell 108a Therefore, the peripheral portion 190h is not fixed by the adhesive 116a onto the other main surface 146a of the liquid crystal cell 108a. In addition, the corner portion 194h lying at an edge of the peripheral portion 190h also protrudes from the area facing the other main surface 146a of the liquid crystal cell 108a, and is not fixed by the adhesive 116a onto the other main surface 146a of the liquid crystal cell 108a.

In the eighth preferred embodiment, the side 182h joins, via a circular arc curve, to the side 184h to round the corner portion 194h. To make the planar shape of the polarizing plate 112h similar to the planar shape of the polarizing plate 110h, the corner portion 196h lying at another edge of the peripheral portion 190h may be rounded.

On the polarizing plate 112h, if a thermal shock is applied, the peripheral portion 188h and the peripheral portion 190h would be likely to crack, where the peripheral portion 190h would be more likely to crack, and the corner portion 194h that is regarded as a singular point would be highly likely to crack.

However, since, on the polarizing plate 112h, the peripheral portion 190h is not fixed onto the other main surface 146a of the liquid crystal cell 108a, but lies freely, a stress will not fully be applied onto the peripheral portion 190h. In addition, since the corner portion 194h is not fixed onto the other main surface 146a of the liquid crystal cell 108a, but lies freely, a stress will not fully be applied onto the corner portion 194h when a thermal shock is applied. Therefore, the peripheral portion 190h, which would be more likely to crack when a thermal shock is applied, is prevented as much as possible from cracking. In addition, the corner portion 194h, which would be highly likely to crack when a thermal shock is applied, is prevented as much as possible from cracking. As a result, the polarizing plate 112h is prevented as much as possible from cracking when a thermal shock is applied during a thermal shock test or ordinary use. Since the corner portion 194h is rounded, the corner portion 194h is further prevented as much as possible from cracking.

The polarizing plates included in the liquid crystal displays according to the second to seventh preferred embodiments may be replaced with polarizing plates with rounded corner portions. Such an example will now be described herein with reference to a ninth preferred embodiment.

11 Ninth Preferred Embodiment

Figure 16:
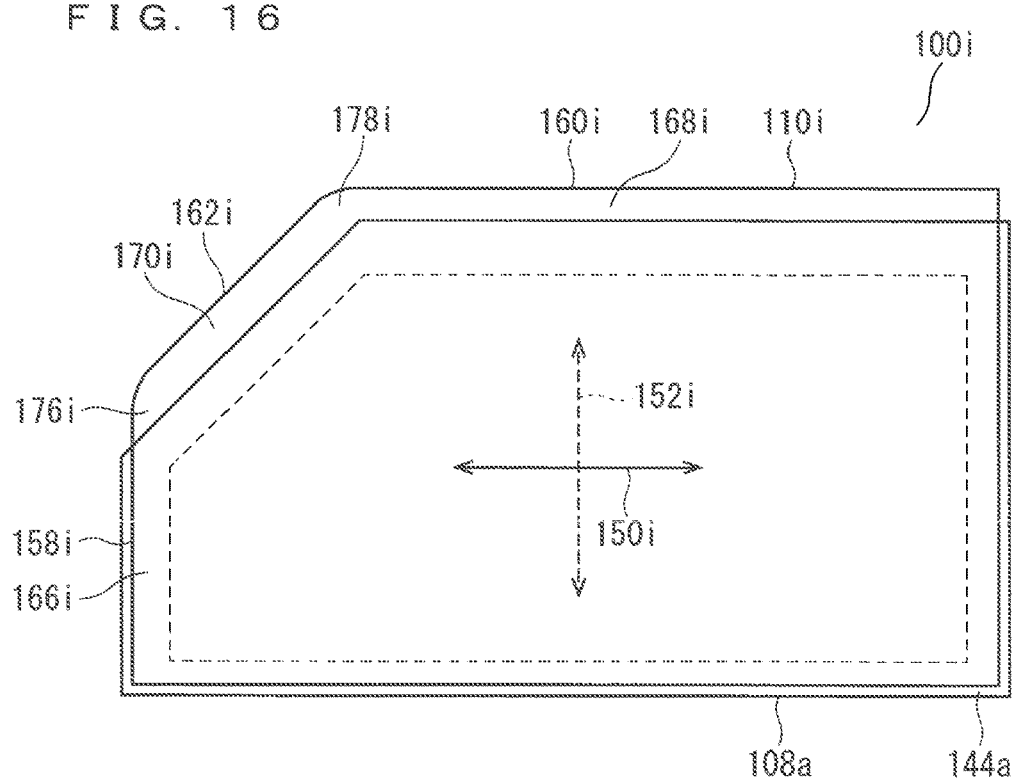
FIGS. 16 and 17 are plan views of a liquid crystal display according to a ninth preferred embodiment.
Figure 17:
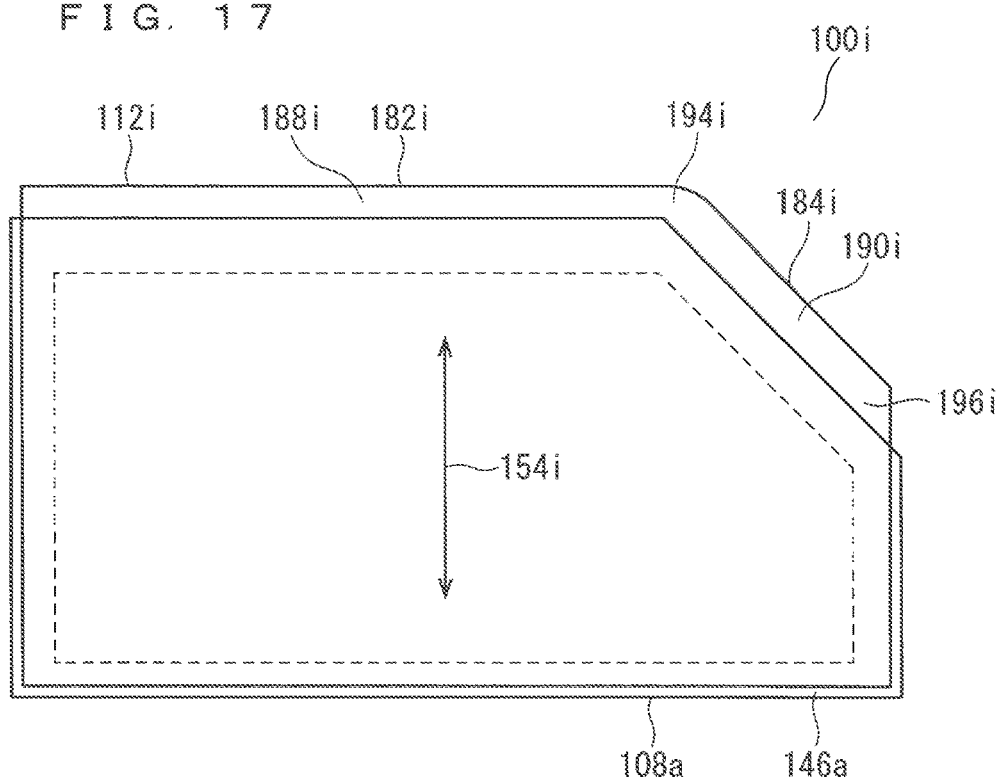

FIGS. 16 and 17 are schematic views of a liquid crystal display according to the ninth preferred embodiment. FIG. 16 is a plan view when viewed from a display face side. FIG. 17 is another plan view when viewed from a back face side.

In a liquid crystal display 100i shown in FIGS. 16 and 17, the polarizing plate 110a and the polarizing plate 112a included in the liquid crystal display 100a according to the first preferred embodiment are respectively replaced with a polarizing plate 110i and a polarizing plate 112i with rounded corner portions.

The polarizing, plate 110i has, as shown in FIG. 16, similar to the polarizing plate 110a according to the first preferred embodiment, an absorption axis extending in an absorption axis direction 150i forming an angle of 0° with a width direction of the liquid crystal display 100i, and a slow axis extending in a slow axis direction 152i forming an angle of 90° with the width direction of the liquid crystal display 100i.

A planar shape of the polarizing plate 110i includes a side 158i extending in a direction perpendicular to the absorption axis direction 150i, a side 160i extending in a direction perpendicular to the slow axis direction 152i, and a side 162i extending in a direction tilted from both of the absorption axis direction 150i and the slow axis direction 152i. The polarizing plate 110i includes a peripheral portion 166i lying along the side 158i, a peripheral portion 168i lying along the sick 160i, and a peripheral portion 170i lying along the side 162i. A corner portion 176i lies at a portion where the peripheral portion 166i and the peripheral portion 170i overlap each other, while a corner portion 178i lies at a portion where the peripheral portion 168i and the peripheral portion 170i overlap each other.

The peripheral portion 170i entirely protrudes from an area facing the main surface 144a of the liquid crystal cell 108a. Therefore, the peripheral portion 170i is not fixed by the adhesive 114a onto the main surface 144a of the liquid crystal cell 108a. In addition, the corner portion 176i and the corner portion 178i respectively lying at edges of the peripheral portion 170i also protrude from the area facing the main surface 144a of the liquid crystal cell 108a, and are not fixed by the adhesive 114a onto the main surface 144a of the liquid crystal cell 108a.

The peripheral portion 168i also entirely protrudes from the area facing the main surface 144a of the liquid crystal cell 108a. Therefore, the peripheral portion 168i is not fixed by the adhesive 114a onto the main surface 144a of the liquid crystal cell 108a.

In the ninth preferred embodiment, the side 158i joins, via a circular arc curve, to the side 162i to round the corner portion 176i. In addition, the side 160i joins, via a circular arc curve, to the side 162i to round the corner portion 178i.

On the polarizing plate 110i, if a thermal shock is applied, the peripheral portion 166i, the peripheral portion 168i, and the peripheral portion 170i would be likely to crack, where the peripheral portion 170i would be more likely to crack, and the corner portion 176i and the corner portion 178i that are regarded as singular points respectively would be highly likely to crack. In addition, on the polarizing plate 110i, the peripheral portion 168i would be more likely to crack than the peripheral portion 166i.

However, since, on the polarizing plate 110i, the peripheral portion 168i and the peripheral portion 170i respectively are not fixed onto the main surface 144a of the liquid crystal cell 108a, but lie freely, a stress will not fully be applied onto the peripheral portion 168i and the peripheral portion 170i respectively when a thermal shock is applied. In addition, since the corner portion 176i and the corner portion 178i respectively are not fixed onto the main surface 144a of the liquid crystal cell 108a, but lie freely, a stress will not fully be applied onto the corner portion 176i and the corner portion 178i respectively. Therefore, the peripheral portion 168i, which would be relatively likely to crack when a thermal shock is applied, is prevented as much as possible from cracking. In addition, the peripheral portion 170i, which would be more likely to crack when a thermal shock is applied, is prevented as much as possible from cracking. In addition, the corner portion 176i and the corner portion 178i, which would be highly likely to crack when a thermal shock is applied, are respectively prevented as much as possible from cracking. As a result, the polarizing plate 110i is prevented as much as possible from cracking when a thermal shock is applied during a thermal shock test or ordinary use. Since the corner portion 176i and the corner portion 178i respectively are rounded, the corner portion 176i and the corner portion 178i respectively are prevented as much as possible from cracking.

The polarizing plate 112i has, as shown in FIG. 17, similar to the polarizing plate 112a according to the first preferred embodiment, an absorption axis extending in an absorption axis direction 154i forming an angle of 90° with the width direction of the liquid crystal display 100i.

A planar shape of the polarizing plate 112i includes a side 182i extending in a direction perpendicular to the absorption axis direction 154i, and a side 184i extending in a direction tilted from the absorption axis direction 154i. The polarizing plate 112i includes a peripheral portion 188i lying along the side 182i, and a peripheral portion 190i lying along the side 184i. A corner portion 194i lies at a portion where the peripheral portion 188i and the peripheral portion 190i overlap each other.

The peripheral portion 190i protrudes from an area facing the other main surface 146a of the liquid crystal cell 108a Therefore, the peripheral portion 190i is not fixed by the adhesive 116a onto the other main surface 146a of the liquid crystal cell 108a. In addition, the corner portion 194i lying at an edge of the peripheral portion 190i also protrudes from the area facing the other main surface 146a of the liquid crystal cell 108a, and is not fixed by the adhesive 116a onto the other main surface 146a of the liquid crystal cell 108a.

The peripheral portion 188i also protrudes from the area facing the other main surface 146a of the liquid crystal cell 108a. Therefore, the peripheral portion 188i is not fixed by the adhesive 116a onto the other main surface 146a of the liquid crystal cell 108a.

In the ninth preferred embodiment, the side 182i joins, via a circular arc curve, to the side 184i to round the corner portion 194i. The corner portion 196i lying at another edge of the peripheral portion 190i may be rounded.

On the polarizing plate 112i, if a thermal shock is applied, the peripheral portion 188i and the peripheral portion 190i respectively would be likely to crack, where the peripheral portion 190i would be more likely to crack, and the corner portion 194i that is regarded as a singular point would be highly likely to crack.

However, since, on the polarizing plate 112i, the peripheral portion 188i and the peripheral portion 190i respectively are not fixed onto the other main surface 146a of the liquid crystal cell 108a, but lie freely, a stress will not fully be applied onto the peripheral portion 188i and the peripheral portion 190i respectively when a thermal shock is applied. In addition, since the corner portion 194i is not fixed onto the other main surface 146a of the Liquid crystal cell 108a, but lies freely, a stress will not fully be applied onto the corner portion 194i. Therefore, the peripheral portion 188i, which would be likely to crack when a thermal shock is applied, is prevented as much as possible from cracking. In addition, the peripheral portion 190i, which would be more likely to crack when a thermal shock is applied, is prevented as much as possible from cracking. In addition, the corner portion 194i, which would be highly likely to crack when a thermal shock is applied, is prevented as much as possible from cracking. As a result, the polarizing plate 112i is prevented as much as possible from cracking when a thermal shock is applied during a thermal shock test or ordinary use. Since the corner portion 194i is rounded, the corner portion 194i is further prevented as much as possible from cracking.

In the liquid crystal display 100i according to the ninth preferred embodiment, a portion of the polarizing plate 112i, Which protrudes from the area facing the other main surface 146a of the liquid crystal cell 108a, overlaps with a portion of the polarizing plate 110i, which protrudes from the area facing the main surface 144a of the liquid crystal cell 108a. As a result, a crack can be prevented as much as possible from occurring with a minimal frame area increase.

12 Tenth Preferred Embodiment

Figure 18:
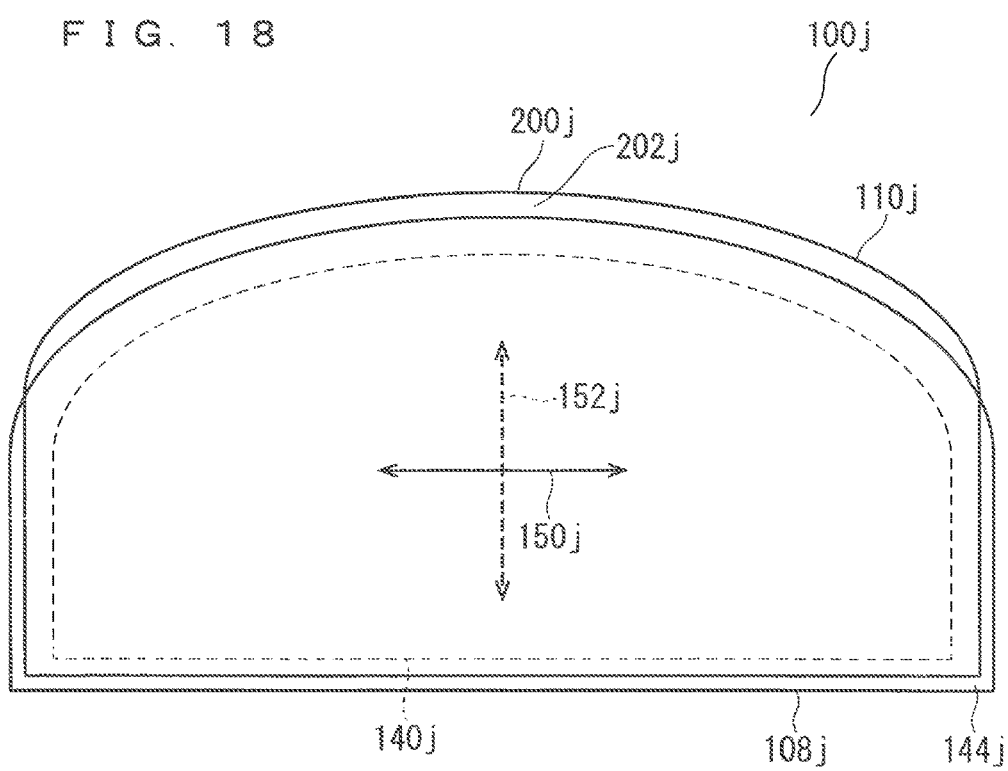
FIGS. 18 and 19 are plan views of a liquid crystal display according to a tenth preferred embodiment.
Figure 19:
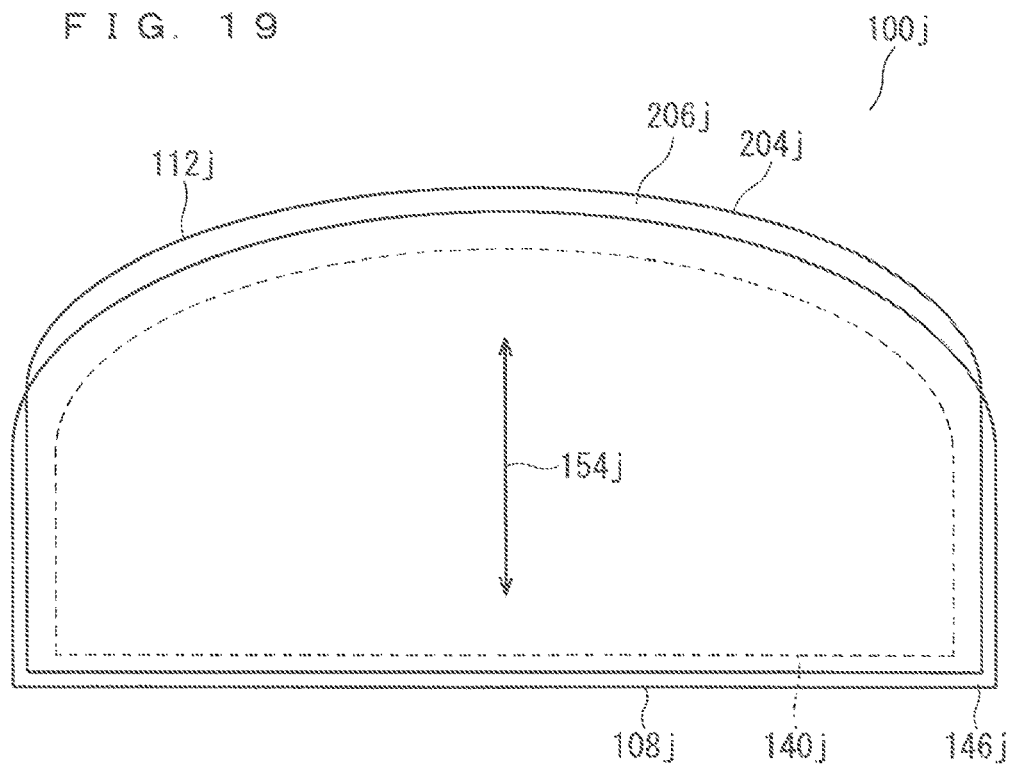

FIGS. 18 and 19 are schematic views of a liquid crystal display according to a tenth preferred embodiment, FIG. 18 is a plan view when viewed from a display face side. FIG. 19 is another plan view when viewed from a back face side.

A liquid crystal display 100j shown in FIGS. 18 and 19 includes a liquid crystal cell 108j, a polarizing plate 110j, and a polarizing plate 112j.

The liquid crystal display 100j is a heteromorphic liquid crystal display having a planar, non-rectangular shape, and has a planar shape having a circular arc contour portion. Accordingly, the liquid crystal cell 108j, the polarizing plate 110j, the polarizing plate 112j, and a display area 140j each have a planar, non-rectangular shape that is a planar shape having a circular arc contour portion. The circular arc contour portion may be replaced with a non-circular arc, curved contour portion.

The polarizing plate 110j has, as shown in FIG. 18, similar to the polarizing plate 110a according to the first preferred embodiment, an absorption axis extending in an absorption axis direction 150j forming an angle of 0° with a width direction of the liquid crystal display 100j, and a slow axis extending in a slow axis direction 152j forming an angle of 90° with the width direction of the liquid crystal display 100j.

The planar shape of the polarizing plate 110j includes a circular arc contour portion 200j. Left and right sides of the circular arc contour portion 200j respectively extend in directions respectively tilted from both the absorption axis direction 150j and the slow axis direction 152j. The polarizing plate 110j includes a peripheral portion 202j lying along the circular arc contour portion 200j.

The peripheral portion 202j entirely protrudes from an area facing a main surface 144j of the liquid crystal cell 108j. Therefore, even though, in the area facing the main surface 144j of the liquid crystal cell 108j, the polarizing plate 110j is applied by an adhesive onto the main surface 144j of the liquid crystal cell 108j, the peripheral portion 202j is not fixed by the adhesive onto the main surface 144j of the liquid crystal cell 108j.

On the polarizing plate 110j, if a thermal shock is applied, the peripheral portion 202j would be more likely to crack.

However, since, on the polarizing plate 110j, the peripheral portion 202j is not fixed onto the main surface 144j of the liquid crystal cell 108i, but lies freely, a stress will not fully be applied onto the peripheral portion 202j when a thermal shock is applied. Therefore, the peripheral portion 202j, which would be likely to crack when a thermal shock is applied, is prevented as much as possible from cracking. As a result, the polarizing plate 110j is prevented as much as possible from cracking when a thermal shock is applied during a thermal shock test or ordinary use.

The polarizing plate 112j has, as shown in FIG. 19, similar to the polarizing plate 112a according to the first preferred embodiment, an absorption axis extending in an absorption axis direction 154j forming an angle of 90° with the width direction of the liquid crystal display 100j.

The planar shape of the polarizing plate 112j has a circular arc contour portion 204j. Left and right sides of the circular arc contour portion 204j respectively extend in directions respectively tilted from the absorption axis direction 154j. The polarizing plate 112j includes a peripheral portion 206j lying along the circular arc contour portion 204j.

The peripheral portion 206j entirely protrudes from an area facing another main surface 146j of the liquid crystal cell 108j. Therefore, even though, in the area facing the other main surface 146j of the liquid crystal cell 108j, the polarizing plate 112j is applied by an adhesive onto the other main surface 146j of the liquid crystal cell 108j, the peripheral portion 202j is not fixed by the adhesive onto the other main surface 146j of the liquid crystal cell 108j.

On the polarizing plate 112j, if a thermal shock is applied, the peripheral portion 206j would be more likely to crack.

However, since, on the polarizing plate 112j, the peripheral portion 206j is not fixed onto the other main surface 146j of the liquid crystal cell 108j, but lies freely, a stress will not fully be applied onto the peripheral portion 202j. Therefore, the peripheral portion 206j, which would be likely to crack when a thermal shock is applied, is prevented as much as possible from cracking. As a result, the polarizing plate 112j is prevented as much as possible from cracking when a thermal shock is applied during a thermal shock test or ordinary use.

A modification may be applied in the tenth preferred embodiment so that, by not using an adhesive between a peripheral portion and one of the main surfaces of the liquid crystal cell 108j, the peripheral portion is not fixed onto the main surface of the liquid crystal cell 108j.

Within its scope of the present invention, the preferred embodiments can be combined freely as well as be modified or omitted in some part as appropriate.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
   a liquid crystal cell having a first planar, non-rectangular shape, and including a main surface;
   a bonding agent; and
   a polarizing plate having a second planar, non-rectangular shape, and having an axis that is either an absorption axis or a slow axis, said second planar shape having a first side extending in a direction perpendicular to said axis, and a second side extending in a direction tilted from said axis, the polarizing plate including a first peripheral portion lying along said first side, a second peripheral portion lying along said second side, and a corner portion lying at a portion where said first peripheral portion and said second peripheral portion overlap each other, the polarizing plate being applied by said bonding agent onto said main surface so that said corner portion is not fixed onto said main surface, and the polarizing plate lying freely from said main surface at said corner portion.

2. The liquid crystal display according to claim 1, wherein said corner portion protrudes from an area facing said main surface.

3. The liquid crystal display according to claim 2, wherein said first peripheral portion protrudes from the area facing said main surface, and said second peripheral portion protrudes from the area facing said main surface.

4. The liquid crystal display according to claim 2, wherein said first peripheral portion lies on the area facing said main surface, and said second peripheral portion protrudes from the area facing said main surface.

5. The liquid crystal display according to claim 4, wherein said axis is a first axis that is either one of said absorption axis and said slow axis, said polarizing plate includes a second axis that is another one of said absorption axis and said slow axis, said second axis being perpendicular to said first axis, said second side extends in a direction tilted from said second axis, and said polarizing plate comprises a polarizing film having said absorption axis, and a phase difference film having said slow axis, the phase difference film being laminated with said polarizing film.

6. The liquid crystal display according to claim 1, wherein said corner portion lies on the area facing said main surface, and said bonding agent is disposed so that said corner portion is not fixed to said main surface.

7. The liquid crystal display according to claim 1, wherein said corner portion is rounded.

8. A liquid crystal display comprising:
   a liquid crystal cell having a first planar, non-rectangular shape, and including a main surface;
   a bonding agent; and
   a polarizing plate having a second planar, non-rectangular shape, and having an axis that is either an absorption axis or a slow axis, said second planar shape including a contour portion extending in a direction tilted from said axis, the polarizing plate including a peripheral portion lying along said contour portion, the polarizing plate being applied by said bonding agent onto said main surface so that said peripheral portion is not fixed to said main surface, and the polarizing plate lying freely from said main surface at said corner portion.

9. The liquid crystal display according to claim 8, wherein said peripheral portion protrudes from an area facing said main surface.

10. The liquid crystal display according to claim 8, wherein said peripheral portion lies on the area facing said main surface, and said bonding agent is disposed so that said peripheral portion is not fixed onto said main surface.

* * * * *